US012185045B2

(12) United States Patent
Zhou et al.

(10) Patent No.: US 12,185,045 B2
(45) Date of Patent: Dec. 31, 2024

(54) MICROPHONE WITH LOW NOISE AND HIGH Q VALUE

(71) Applicant: SHENZHEN SHOKZ CO., LTD., Guangdong (CN)

(72) Inventors: Wenbing Zhou, Shenzhen (CN); Yujia Huang, Shenzhen (CN); Yongshuai Yuan, Shenzhen (CN); Wenjun Deng, Shenzhen (CN); Xin Qi, Shenzhen (CN); Fengyun Liao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 151 days.

(21) Appl. No.: 17/816,019

(22) Filed: Jul. 29, 2022

(65) Prior Publication Data

US 2023/0047687 A1 Feb. 16, 2023

Related U.S. Application Data

(63) Continuation of application No. PCT/CN2021/112056, filed on Aug. 11, 2021.

(51) Int. Cl.
*H04R 1/08* (2006.01)
*H04R 1/04* (2006.01)
(Continued)

(52) U.S. Cl.
CPC ............... *H04R 1/083* (2013.01); *H04R 1/04* (2013.01); *H04R 1/2807* (2013.01); *H04R 17/02* (2013.01); *H04R 2460/13* (2013.01)

(58) Field of Classification Search
CPC .............. H04R 1/083; H04R 2201/003; H04R 1/2807; H04R 19/04; H04R 2460/13; H04R 1/04; H04R 17/02; B81B 2201/0257
(Continued)

(56) References Cited

U.S. PATENT DOCUMENTS 9,438,979 B2 9/2016 Dehe
9,986,344 B2 5/2018 Dehe et al.
(Continued)

FOREIGN PATENT DOCUMENTS

CN 109246566 A 1/2019
CN 110560350 A 12/2019
(Continued)

OTHER PUBLICATIONS

The Extended European Search Report in European Application No. 21923594.2 mailed on Apr. 6, 2023, 12 pages.
(Continued)

*Primary Examiner* — Norman Yu
(74) *Attorney, Agent, or Firm* — Metis IP LLC

(57) ABSTRACT

The present disclosure may provide a microphone. The microphone may include: a shell structure and a vibration pickup portion, wherein the vibration pickup portion may generate vibration in response to vibration of the shell structure; the vibration transmission portion may be configured to transmit the vibration generated by the vibration pickup portion; and an acoustic-electric conversion component configured to receive the vibration transmitted by the vibration transmission portion to generate an electrical signal, wherein the vibration transmission portion and at least a portion of vibration pickup portion may form a vacuum cavity, and the acoustic-electric conversion component may be located in the vacuum cavity.

13 Claims, 20 Drawing Sheets

(51) Int. Cl.
*H04R 1/28* (2006.01)
*H04R 17/02* (2006.01)

(58) Field of Classification Search
USPC ................ 381/191, 150, 114, 113, 162, 151; 438/53
See application file for complete search history.

(56) References Cited

U.S. PATENT DOCUMENTS

| | | | | |
|---|---|---|---|---|
| 2013/0170669 | A1 | 7/2013 | Fukuzawa et al. | |
| 2015/0001647 | A1* | 1/2015 | Dehe | H04R 31/00 257/416 |
| 2015/0256913 | A1* | 9/2015 | Dehe | H04R 19/04 381/176 |
| 2016/0258824 | A1* | 9/2016 | Fuji | G01L 1/125 |
| 2018/0352341 | A1 | 12/2018 | Reinmuth et al. | |
| 2019/0007759 | A1* | 1/2019 | Meisel | B81B 7/0061 |
| 2020/0267480 | A1 | 8/2020 | Zou et al. | |
| 2020/0351595 | A1* | 11/2020 | Rusconi Clerici Beltrami | H04R 19/02 |
| 2020/0359127 | A1 | 11/2020 | Zou et al. | |
| 2021/0227335 | A1 | 7/2021 | Zou et al. | |
| 2022/0205820 | A1 | 6/2022 | Bai et al. | |
| 2022/0286772 | A1 | 9/2022 | Zhou et al. | |

FOREIGN PATENT DOCUMENTS

| | | | |
|---|---|---|---|
| CN | 111669690 | A | 9/2020 |
| CN | 211959556 | U | 11/2020 |
| EP | 3457098 | A1 | 3/2019 |
| WO | 2018011048 | A1 | 1/2018 |

OTHER PUBLICATIONS

Decision of grant in Russian Application No. 2022122121 mailed on Mar. 1, 2023, 22 pages.

* cited by examiner

1200

1700

MICROPHONE WITH LOW NOISE AND HIGH Q VALUE

CROSS-REFERENCE TO RELATED APPLICATIONS

This application is a continuation of International Patent Application No. PCT/CN2021/112056, filed on Aug. 11, 2021, the contents of which are hereby incorporated by reference in its entirety.

TECHNICAL FIELD

The present disclosure relates to a technical field of a sound transmission device, and in particular, to a microphone.

BACKGROUND

A microphone is a transducer that converts sound signals into electrical signals. Taking an air conduction microphone as an example, an external sound signal enters an acoustic cavity of the air conduction microphone through a hole portion on a shell structure and is transmitted to an acoustic-electric conversion component. The acoustic-electric conversion component generates vibration based on the sound signal and converts a vibration signal into an electrical signal for output. The acoustic cavity of the microphone has gas (e.g., air) of a certain air pressure, which may cause relatively loud noise in the process of transmitting the sound signal to the acoustic-electric conversion component through the acoustic cavity of the microphone, and reduce the sound quality output by the microphone. On the other hand, when the acoustic-electric conversion component of the microphone receives the sound signal and generates the vibration, the acoustic-electric conversion component may rub against the gas in the acoustic cavity, thereby increasing air damping of the acoustic cavity of the microphone, and reducing a Q value of the microphone.

Therefore, it is desirable to provide a microphone with low background noise and a high Q value.

SUMMARY

The embodiment of the present disclosure may provide a microphone. The microphone may include a shell structure and a vibration pickup portion, wherein the vibration pickup portion may generate vibration in response to vibration of the shell structure; the vibration transmission portion may be configured to transmit the vibration generated by the vibration pickup portion; and an acoustic-electric conversion component configured to receive the vibration transmitted by the vibration transmission portion to generate an electrical signal, wherein the vibration transmission portion and at least a portion of vibration pickup portion may form a vacuum cavity, and the acoustic-electric conversion component may be located in the vacuum cavity.

In some embodiments, the vacuum degree in the vacuum cavity may be smaller than 100 Pa.

In some embodiments, the vacuum degree in the vacuum cavity may be $10^{-6}$ Pa-100 Pa.

In some embodiments, the vibration pickup portion and the shell structure may form at least one acoustic cavity, the at least one acoustic cavity may include a first acoustic cavity; the shell structure may include at least one hole portion, the at least one hole portion may be located at a side wall of the shell structure corresponding to the first acoustic cavity, and the at least one hole portion may connect the first acoustic cavity with outside; wherein the vibration pickup portion may generate the vibration in response to an external sound signal transmitted through the at least one hole portion, and the acoustic-electric conversion component may receive the vibration of the vibration pickup portion to generate the electrical signal.

In some embodiments, the vibration pickup portion may include a first vibration pickup portion and a second vibration pickup portion arranged from top to bottom, the vibration transmission may have a tubular structure and be arranged between the first vibration pickup portion and the second vibration pickup portion; and the vibration transmission portion, the first vibration pickup portion, and the second vibration pickup portion may form the vacuum cavity, the first vibration pickup portion and the second vibration pickup portion may be connected to the shell structure through their peripheral sides, wherein at least a portion of the first vibration pickup portion and the second vibration pickup portion may generate the vibration in response to an external sound signal.

In some embodiments, the first vibration pickup portion or the second vibration pickup portion may include an elastic portion and a fixed portion; the fixed portion of the first vibration pickup portion, the fixed portion of the second vibration pickup portion, and the vibration transmission portion may form the vacuum cavity; and the elastic portion may be connected between the fixed portion and an inner wall of the shell structure, wherein the elastic portion may generate the vibration in response to the external sound signal.

In some embodiments, a rigidity of the fixed portion may be greater than a rigidity of the elastic portion.

In some embodiments, Yang's modulus of the fixed portion may be greater than 50 GPa.

In some embodiments, the microphone may further include a reinforcing component, and the reinforcing component may be located on an upper surface or a lower surface of the first vibration pickup portion and the second vibration pickup portion corresponding to the vacuum cavity.

In some embodiments, the vibration pickup portion may include a first vibration pickup portion, a second vibration pickup portion, and a third vibration pickup portion, the first vibration pickup portion and the second vibration pickup portion may be arranged opposite to each other from up to down, the vibration transmission portion may have a tubular structure and be arranged between the first vibration pickup portion and the second vibration pickup portion, and the vibration transmission portion, the first vibration pickup portion and the second vibration pickup portion may form the vacuum cavity; and the third vibration pickup portion may be connected between the vibration transmission portion and the inner wall of the shell structure, wherein the third vibration pickup portion may generate the vibration in response to an external sound signal.

In some embodiments, a rigidity of the first vibration pickup portion and a rigidity of the second vibration pickup portion may be greater than a rigidity of the third vibration pickup portion.

In some embodiments, Young's modulus of the first vibration pickup portion and Young's modulus of the second vibration pickup portion may be greater than 50 GPa.

In some embodiments, the acoustic-electric conversion component may include a cantilever beam structure, one end of the cantilever beam structure may be connected to an inner wall of the vibration transmission portion, and another end of the cantilever beam structure may be suspended in the vacuum cavity, wherein the cantilever beam structure may deform based on a vibration signal to convert the vibration signal into an electrical signal.

In some embodiments, the cantilever beam structure may include a first electrode layer, a piezoelectric layer, a second electrode layer, an elastic layer, and a base layer; the first electrode layer, the piezoelectric layer, and the second electrode layer may be arranged from top to bottom; the elastic layer may be located on an upper surface of the first electrode layer or a lower surface of the second electrode layer, and the base layer may be located on an upper surface or a lower surface of the elastic layer.

In some embodiments, the cantilever beam structure may include at least one elastic layer, an electrode layer, and a piezoelectric layer; the at least one elastic layer may be located on a surface of the electrode layer; the electrode layer may include a first electrode and a second electrode, wherein the first electrode may be bent into a first comb-like structure; the second electrode may be bent into a second comb-like structure; the first comb-like structure and the second comb-like structure may be cooperated to form the electrode layer; the electrode layer may be located on an upper surface or lower surface of the piezoelectric layer; and the first comb-like structure and the second comb-like structure may extend along a length direction of the cantilever beam structure.

In some embodiments, the acoustic-electric conversion component may include a first cantilever beam structure and a second cantilever beam structure, the first cantilever beam structure and the second cantilever beam structure may be arranged opposite to each other, and the first cantilever beam structure and the second cantilever beam structure may have a first gap, wherein the first gap between the first cantilever beam structure and the second cantilever beam structure may change based on a vibration signal to convert the vibration signal into an electrical signal.

In some embodiments, one end of the first cantilever beam structure and the second cantilever beam structure corresponding to the acoustic-electric conversion component may be connected to an inner wall on a peripheral side of the vibration transmission portion, and another end of the first cantilever beam structure and the second cantilever beam structure may be suspended in the vacuum cavity.

In some embodiments, a rigidity of the first cantilever beam structure may be different from a rigidity of the second cantilever beam structure.

In some embodiments, the microphone may include at least one film structure, the at least one film structure may be located on an upper surface and/or a lower surface of the acoustic-electric conversion component.

In some embodiments, the at least one film structure may wholly or partially cover the upper surface and/or the lower surface of the acoustic-electric conversion component.

In some embodiments, the microphone may include at least one supporting structure, one end of the at least one supporting structure may be connected to a first vibration pickup portion of the vibration pickup portion, another end of the at least one supporting structure may be connected to a second vibration pickup portion of the vibration pickup portion, and a free end of the acoustic-electric conversion component and the supporting structure may have a second gap.

BRIEF DESCRIPTION OF THE DRAWINGS

The present disclosure is further illustrated in terms of exemplary embodiments. These exemplary embodiments are described in detail with reference to the drawings. These embodiments are not limited, in these embodiments, the same number represents the same structure, wherein.

DETAILED DESCRIPTION

Figure 1:
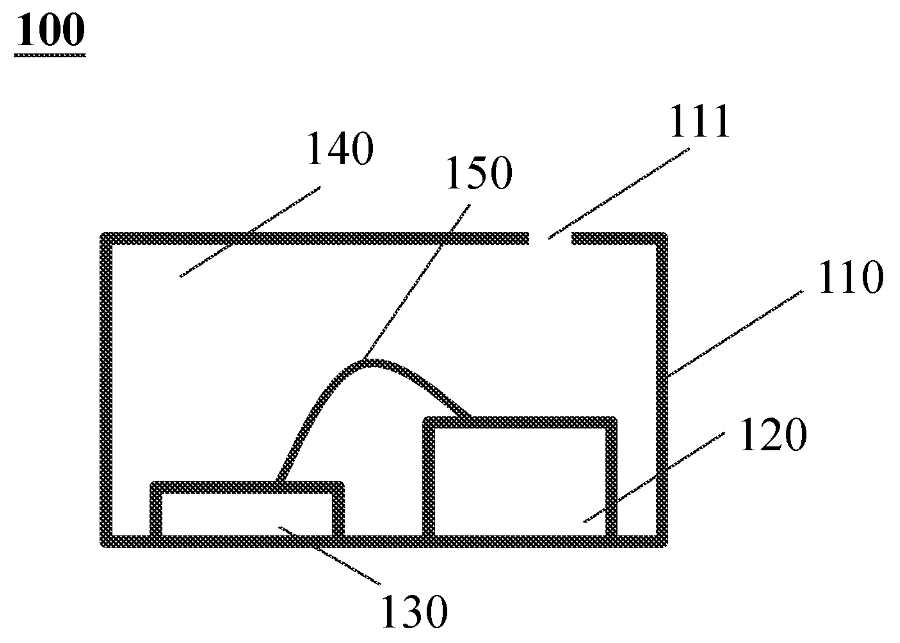
FIG. 1 is a schematic diagram illustrating a structure of a microphone according to some embodiments of the present disclosure.

In order to illustrate the technical solutions related to the embodiments of the present disclosure, a brief introduction of the drawings referred to in the description of the embodiments is provided below. Obviously, the drawings described below are only some examples or embodiments of the present disclosure. Those skilled in the art, without further creative efforts, may apply the present disclosure to other similar scenarios according to these drawings. Unless apparent from the locale or otherwise stated, reference numerals represent similar structures or operations throughout the several views of the drawings.

It will be understood that the "system", "device", "unit" and/or "module" used herein is a method for distinguishing different components, elements, components, parts, or assemblies at different levels. However, if other words can achieve the same purpose, they can be replaced by other expressions.

As used in the disclosure and the appended claims, the singular forms "a," "an," and "the" include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements.

The flowcharts used in the present disclosure illustrate operations that systems implement according to some embodiments of the present disclosure. It is to be expressly understood that the preceding or following operations are not necessarily performed accurately in order. Conversely, the operations may be processed in an inverted order, or simultaneously. Moreover, one or more other operations may be added to the flowcharts. One or more operations may be removed from the flowcharts.

The present disclosure may describe a microphone. The microphone may be a transducer that converts a sound signal into an electrical signal. In some embodiments, the microphone may be a moving coil microphone, a belt microphone, a capacitive microphone, a piezoelectric microphone, an electret microphone, an electromagnetic microphone, a carbon particle microphone, or the like, or any combination thereof. In some embodiments, distinct by means of sound acquisition, the microphone may include a bone conduction microphone and an air conduction microphone. The microphone described in the embodiments of the present disclosure may include a shell structure, a vibration pickup portion, a vibration transmission portion, and an acoustic-electric conversion component. The shell structure may be configured to carry the vibration pickup portion, the vibration transmission portion, and the acoustic-electric conversion component. In some embodiments, the shell structure may be an internally hollow structure. The shell structure may independently form an acoustic cavity. The vibration pickup portion, the vibration transmission portion, and the acoustic-electric conversion component may be located in the acoustic cavity of the shell structure. In some embodiments, the vibration pickup portion may be connected to a side wall of the shell structure. The vibration pickup portion may generate vibration in response to an external sound signal transmitted to the shell structure. In some embodiments, the vibration transmission portion may be connected to the vibration pickup portion. The vibration transmission portion may receive the vibration of the vibration pickup portion and transmit the vibration signal to the acoustic-electric conversion component. The acoustic-electric conversion component may convert the vibration signal into an electric signal. In some embodiments, the vibration transmission portion and at least a portion of the vibration pickup portion (e.g., a fixed portion) may form a vacuum cavity. The acoustic-electric conversion component may be located in the vacuum cavity. The acoustic-electric conversion component in the microphone provided by the embodiments of the present disclosure may be located in the vacuum cavity, and the vacuum cavity may be formed by the vibration pickup portion and the vibration transmission portion. The external sound signal may enter the acoustic cavity of the shell structure through the hole portion, causing the air in the acoustic cavity to generate the vibration. The vibration pickup portion and the vibration transmission portion may transmit the vibration to the acoustic-electric conversion component in the vacuum cavity, avoiding the acoustic-electric conversion component from contacting the air in the acoustic cavity, and furthermore solving the influence of the air vibration of the acoustic cavity during the work of the acoustic-electric conversion component, that is to say, the problem of the relatively loud background noise of the microphone may be solved. On the other hand, the acoustic-electric conversion component may be located in the vacuum cavity, which may avoid the acoustic-electric conversion component from rubbing with the gas during the vibration process, thereby reducing the air damping in the vacuum cavity of the microphone and improving the Q value of the microphone.

FIG. 1 is a schematic diagram illustrating ay structure of a microphone according to some embodiments of the present disclosure. As shown in FIG. 1, the microphone 100 may include a shell structure 110, an acoustic-electric conversion component 120, and a processor 130. The microphone 100 may generate deformation and/or displacement based on an external signal, such as an acoustic signal (e.g., a sound wave), a mechanical vibration signal, or the like. The deformation and/or displacement may be further converted into an electrical signal by the acoustic-electric conversion component 120 of the microphone 100. In some embodiments, the microphone 100 may be an air conduction microphone, a bone conduction microphone, or the like. The air conduction microphone may refer to a microphone in which a sound wave is transmitted through air. The bone conduction microphone may refer to a microphone in which a sound wave is transmitted in a solid (e.g., bone) by means of mechanical vibration.

The shell structure 110 may be an internally hollow structure. The shell structure 110 may independently form an acoustic cavity 140. The acoustic-electric conversion component 120 and the processor 130 may be located in the acoustic cavity 140. In some embodiments, a material of the shell structure 110 may include but be not limited to one or more of a metal, an alloy material, a polymer material (e.g., acrylonitrile-butadiene-styrene copolymer, polyvinyl chloride, polycarbonate, polypropylene, etc.). In some embodiments, a side wall of the shell structure 110 may be provided with one or more hole portions 111. The one or more hole portions 111 may guide an external sound signal into the acoustic cavity 140. In some embodiments, the external sound signal may enter the acoustic cavity 140 of the microphone 100 from the hole portion(s) 111 and cause the air in the acoustic cavity 140 to generate vibration. The acoustic-electric conversion component 120 may receive the vibration signal and convert the vibration signal into an electrical signal for output.

The acoustic-electric conversion component 120 may be used to convert the external signal into a target signal. In some embodiments, the acoustic-electric conversion component 120 may be a laminated structure. In some embodiments, at least part of the laminated structure may be physically connected to the shell structure. The "connected" mentioned in the present disclosure may be understood as a connection between different portions of the same structure, or after preparing different portions or structures, the independent portions or structures are fixedly connected by means of welding, riveting, clamping, bolt connection, adhesive bonding, etc., or during the preparation process, a first component or structure is deposited on a second component or structure by physical deposition (e.g., physical vapor deposition) or chemical deposition (e.g., chemical vapor deposition). In some embodiments, at least a portion of the laminated structure may be fixed to a side wall of the shell structure. For example, the laminated structure may be a cantilever beam structure. The cantilever beam structure may be a plate-shaped structure. One end of the cantilever beam structure may be connected to a side wall where the cavity of the shell structure is located, and another end of the cantilever beam structure may be not connected or contacted to a base structure so that the another end of the cantilever beam structure is suspended in the cavity of the shell structure. As another example, the microphone may include a vibrating diaphragm layer (also referred to as a vibrating pickup portion). The vibrating pickup portion may be fixedly connected to the shell structure. The laminated structure may be arranged on an upper surface or lower surface of the vibrating pickup portion. It should be noted that "located in the cavity" or "suspended in the cavity" mentioned in the present disclosure may mean suspended in the interior, below, or above the cavity. In some embodiments, the acoustic-electric conversion component 120 may also be connected to the shell structure 110 through other components (e.g., the vibration pickup portion, a vibration transmission portion).

In some embodiments, the laminated structure may include a vibration unit and an acoustic transducer unit. The vibration unit may refer to a portion of the laminated structure that is prone to deformation by an external force. The vibration unit may be used to transmit the deformation caused by the external force to the acoustic transducer unit. The acoustic transducer unit may refer to a portion that converts the deformation of the vibration unit into an electrical signal in the laminated structure. Specifically, the external sound signal may enter the acoustic cavity 140 through the hole portion(s) 111, causing the air in the acoustic cavity 140 to generate the vibration. The vibration unit may deform in response to the vibration of the air in the acoustic cavity 140. The acoustic transducer unit may generate the electrical signal based on the deformation of the vibration unit. It should be noted that the description of the vibration unit and the acoustic transducer unit herein is only for the purpose of introducing the working principle of the laminated structure, and does not limit the actual composition and structure of the laminated structure. In fact, the vibration unit may be unnecessary, and its function may be completely realized by the acoustic transducer unit. For example, after making a certain change to the structure of the acoustic transducer unit, the acoustic transducer unit may directly respond to the vibration of the base structure to generate the electrical signal.

In some embodiments, the vibration unit and the acoustic transducer unit may overlap to form the laminated structure. The acoustic transducer unit may be located at an upper layer of the vibration unit. The acoustic transducer unit may also be located at a lower layer of the vibration unit.

In some embodiments, the acoustic transducer unit may include at least two electrode layers (e.g., a first electrode layer and a second electrode layer) and a piezoelectric layer. The piezoelectric layer may be located between the first electrode layer and the second electrode layer. The piezoelectric layer may refer to a structure that generates a voltage on its two end surfaces when they are subjected to an external force. In some embodiments, the piezoelectric layer may generate the voltage under a deformation stress of the vibration unit, and the first electrode layer and the second electrode layer may collect the voltage (i.e., an electrical signal).

The processor 130 may acquire the electrical signal from the acoustic-electric conversion component 120 and perform signal processing. In some embodiments, the processor 130 may be directly connected to the acoustic-electric conversion component 120 through a wire 150 (e.g., a gold wire, a copper wire, an aluminum wire, etc.). In some embodiments, the signal processing may include frequency adjustment processing, amplitude adjustment processing, filtering processing, denoise processing, or the like. In some embodiments, the processor 130 may include but be not limited to, a microcontroller, a microprocessor, an application-specific integrated circuit (ASIC), an application-specific instruction-set processor (ASIP), a central processing unit (CPU), a physical processor unit (PPU), a digital signal processor (DSP), a field-programmable gate array (FPGA), an advanced RISC machine (ARM), a programmable logic device (PLD), or the like, or other types of processing circuits or processors.

In some embodiments, when the microphone 100 is used as an air conduction microphone (e.g., an air conduction mike), the acoustic cavity 140 may be acoustically communicated with the outside of the microphone 100 through the hole portion(s) 111, so that the acoustic cavity 140 has gas (e.g., air) with a certain air pressure. When a sound signal is transmitted from the hole portion(s) 111 through the acoustic cavity 140 to the acoustic-electric conversion component 120, the air inside the acoustic cavity 140 generates vibration. While the vibration acts on the acoustic-electric conversion component 120 to generate vibration, it may bring a loud background noise to the microphone 100. On the other hand, in the process of receiving the sound signal to generate the vibration, the acoustic-electric conversion component 120 may rub against the gas inside the acoustic cavity 140 to increase the air damping inside the acoustic cavity 140, thereby reducing the Q value of the microphone 100. In order to solve the above problems, the embodiments of the present disclosure may provide a microphone, and the specific content of the microphone may be referred to the followings.

Figure 2:
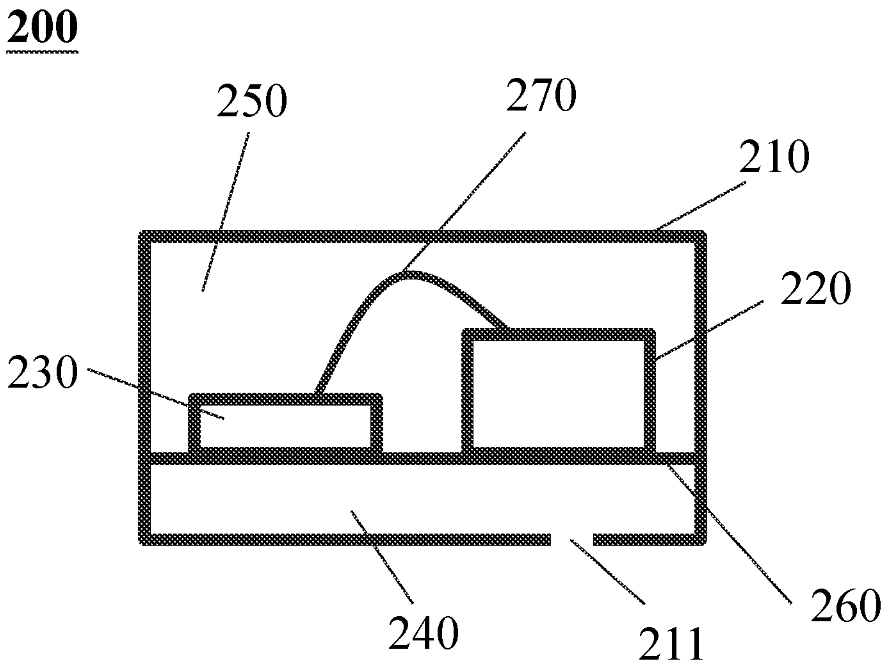
FIG. 2 is a schematic diagram illustrating another structure of a microphone according to some embodiments of the present disclosure.

FIG. 2 is a schematic diagram illustrating a structure of a microphone according to some embodiments of the present disclosure. As shown in FIG. 2, the microphone 200 may include a shell structure 210, an acoustic-electric conversion component 220, and a processor 230. The microphone 200 shown in FIG. 2 may be the same as or similar to the microphone 100 shown in FIG. 1. For example, the shell structure 210 of the microphone 200 may be the same as or similar to the shell structure 110 of the microphone 100. As another example, the acoustic-electric conversion component 220 of the microphone 200 may be the same as or similar to the acoustic-electric conversion component 120 of the microphone 100. For more structure of the microphone 200 (e.g., the processor 230, the wire 270, etc.), reference may be made to FIG. 1 and its related descriptions.

In some embodiments, the difference between the microphone 200 and the microphone 100 may be that the microphone 200 may also include a vibration pickup portion 260. The vibration pickup portion 260 may be located in an acoustic cavity of the shell structure 210. A peripheral side of the vibration pickup portion 260 may be connected to a side wall of the shell structure 210, thereby separating the acoustic cavity into a first acoustic cavity 240 and a second acoustic cavity 250. In some embodiments, the microphone 200 may include one or more hole portions 211. The hole portion(s) 211 may be located at a side wall of the shell structure 210 corresponding to the first acoustic cavity 240. The hole portion(s) 211 may connect the first acoustic cavity 240 with the outside of the microphone 200. An external sound signal may enter the first acoustic cavity 240 through the hole portion(s) 211 and cause the air in the first acoustic cavity 240 to generate vibration. The vibration pickup portion 260 may pick up the air vibration in the first acoustic cavity 240 and transmit the vibration signal to the acoustic-electric conversion component 220. The acoustic-electric conversion component 220 may receive the vibration signal from the vibration pickup portion 260 and convert the vibration signal into an electrical signal.

In some embodiments, a material of the vibration pickup portion 260 may include but be not limited to, one or more of a semiconductor material, a metallic material, a metallic alloy, an organic material, or the like. In some embodiments, the semiconductor material may include but be not limited to, silicon, silicon dioxide, silicon nitride, silicon carbide, or the like. In some embodiments, the metallic material may include but be not limited to, copper, aluminum, chromium, titanium, gold, or the like. In some embodiments, the metallic alloy may include but be not limited to, a copper-aluminum alloy, a copper-gold alloy, a titanium alloy, an aluminum alloy, or the like. In some embodiments, the organic material may include but be not limited to polyimide, parylene, polydimethylsiloxane (PDMS), silica gel, silica, or the like. In some embodiments, the structure of the vibration pickup portion 260 may be a plate-shaped structure, a column-shaped structure, or the like.

In some embodiments, the acoustic-electric conversion component 220 and the processor 230 may be located in the second acoustic cavity 250. The second acoustic cavity 250 may be a vacuum cavity. In some embodiments, the acoustic-electric conversion component 220 may be located in the second acoustic cavity 250, which avoids the acoustic-electric conversion component 220 contacting the air in the second acoustic cavity 250, thus solving the influence of the air vibration inside the second acoustic cavity 250 during the acoustic-electric conversion process of the acoustic-electric conversion component 220, that is, solving the problem of the loud background noise of the microphone 200. On the other hand, the acoustic-electric conversion component 220 may be located in the second acoustic cavity 250, which may avoid friction between the acoustic-electric conversion component 220 and the air inside the second acoustic cavity 250 during the vibration, thereby reducing the air damping inside the second acoustic cavity 250 and improving the Q value of the microphone 200. In some embodiments, a vacuum degree in the second acoustic cavity 250 may be smaller than 100 Pa. In some embodiments, the vacuum degree in the second academic cavity 250 may be $10^{-6}$ Pa-100 Pa. In some embodiments, the vacuum degree in the second academic cavity 250 may be $10^{-7}$ Pa-100 Pa.

Figure 3:
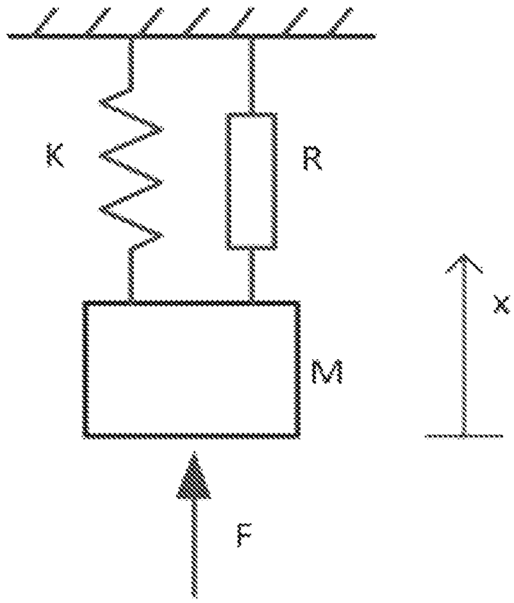
FIG. 3 is a schematic diagram illustrating a spring-mass-damping system of an acoustic-electric conversion component according to some embodiments of the present disclosure.

In order to facilitate the understanding of the acoustic-electric conversion component, in some embodiments, the acoustic-electric conversion component of the microphone may be approximately equivalent to a spring-mass-damping system. When the microphone operates, the spring-mass-damping system may vibrate under the action of an excitation source (e.g., the vibration of the vibration pickup portion). FIG. 3 is a schematic diagram illustrating the spring-mass-damping system of the acoustic-electric conversion component according to some embodiments of the present disclosure. As shown in FIG. 3, the spring-mass-damping system may move according to the differential equation (1):

$$M\frac{d^2x}{dt^2} + R\frac{dx}{dt} + Kx = F\cos\omega, \quad (1)$$

where M refers to the mass of the spring-mass-damping system, x refers to a displacement of the spring-mass-damping system, R refers to the damping of the spring-mass-damping system, K refers to an elastic coefficient of the spring-mass-damping, F refers to an amplitude of a driving force, and ω refers to a circular frequency of the external force.

The differential equation (1) may be solved to obtain the displacement at a steady-state (2):

$$x = x_a\cos(\omega t - \theta), \quad (2)$$

where x refers to the deformation of the spring-mass-damping system, which is equal to an output value of the electrical signal when the microphone work $x_a$ of $$x_a = \frac{F}{\omega|Z|} = \frac{F}{\omega\sqrt{R^2 + (\omega M - K\omega^{-1})^2}}$$

refers to the output displacement, Z refers to a mechanical impedance, and θ refers to an oscillation phase.

Normalization of a ratio A between the displacement and the amplitude may be described as equation (3):

$$A = \frac{x_a}{x_{a0}} = \frac{Q_m}{\sqrt{\frac{f^2}{f_0} + \left(\frac{f^2}{f_0} - 1\right)^2 Q_m^{\ 2}}}, \quad (3)$$

Where, $x_{a0}$ of $$x_{a0} = \frac{F}{K}$$

refers to the displacement amplitude under the steady-state (or the displacement amplitude when ω=0), $$\frac{f}{f_0} \text{ of } \frac{f}{f_0} = \frac{\omega}{\omega_0}$$

refers to a ratio or an external-force frequency to a natural frequency, $\omega_0$ of $\omega_0$=K/M refers to a circumferential frequency of the vibration, and $Q_m$ of $$Q_m = \frac{\omega_0 M}{R}$$

refers to a mechanical quality factor.

Figure 4:
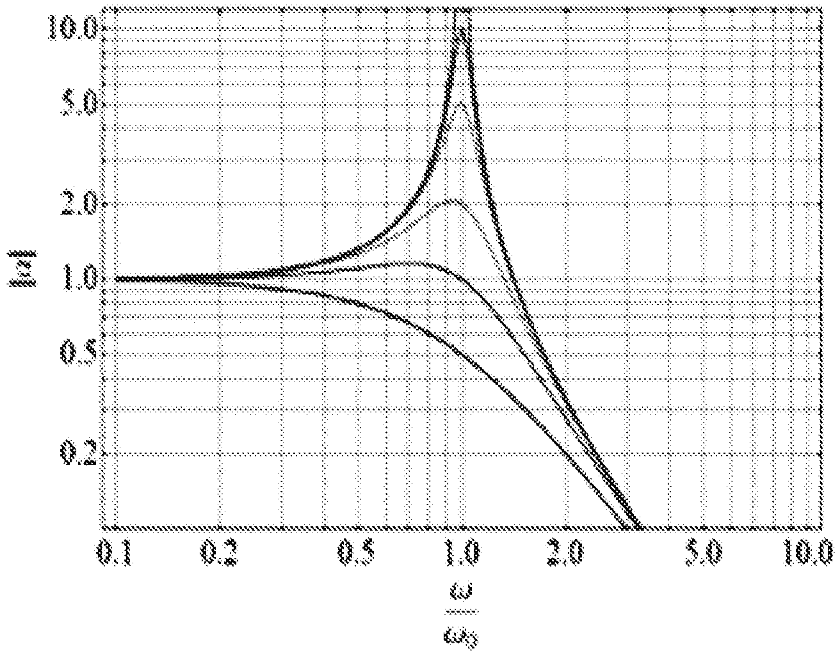
FIG. 4 is a schematic diagram illustrating normalization of displacement resonance curve of a spring-mass-damping system according to some embodiments of the present disclosure.

FIG. 4 is a schematic diagram illustrating normalization of displacement resonance curves of a spring-mass-damping system according to some embodiments of the present disclosure. The horizontal axis may refer to a ratio of an actual vibration frequency of the spring-mass-damping system to its natural frequency, and the vertical axis may refer to a normalized displacement of the spring-mass-damping system. It should be understood that each curve in FIG. 4 may refer to a displacement resonance curve of the spring-mass-damping system with different parameters. In some embodiments, the microphone may generate an electrical signal through a relative displacement between the acoustic-electric conversion component and the shell structure. For example, an electret microphone may generate an electrical signal according to a change in a distance between a deformed diaphragm and a substrate. As another example, a bone conduction microphone of a cantilever beam structure may generate an electrical signal based on an inverse piezoelectric effect caused by a deformed cantilever beam structure. In some embodiments, the greater the displacement of the cantilever beam structure deforms, the greater the electrical signal output by the microphone may be. As shown in FIG. 4, when the actual vibration frequency of the spring-mass-damping system is the same or approximately the same as its natural frequency (i.e., when the ratio ($\omega/\omega_0$) of the actual vibration frequency of the spring-mass-damping system to its natural frequency is equal to or approximately equal to 1), the larger the normalized displacement of the spring-mass-damping system is, the narrower a 3 dB bandwidth (which may be understood as a resonance frequency range here) of a resonance peak in the displacement resonance curve may be. According to the above equation (3), the larger the normalized displacement of the spring-mass-damping system is, the larger the Q value of the microphone may be.

Figure 5:
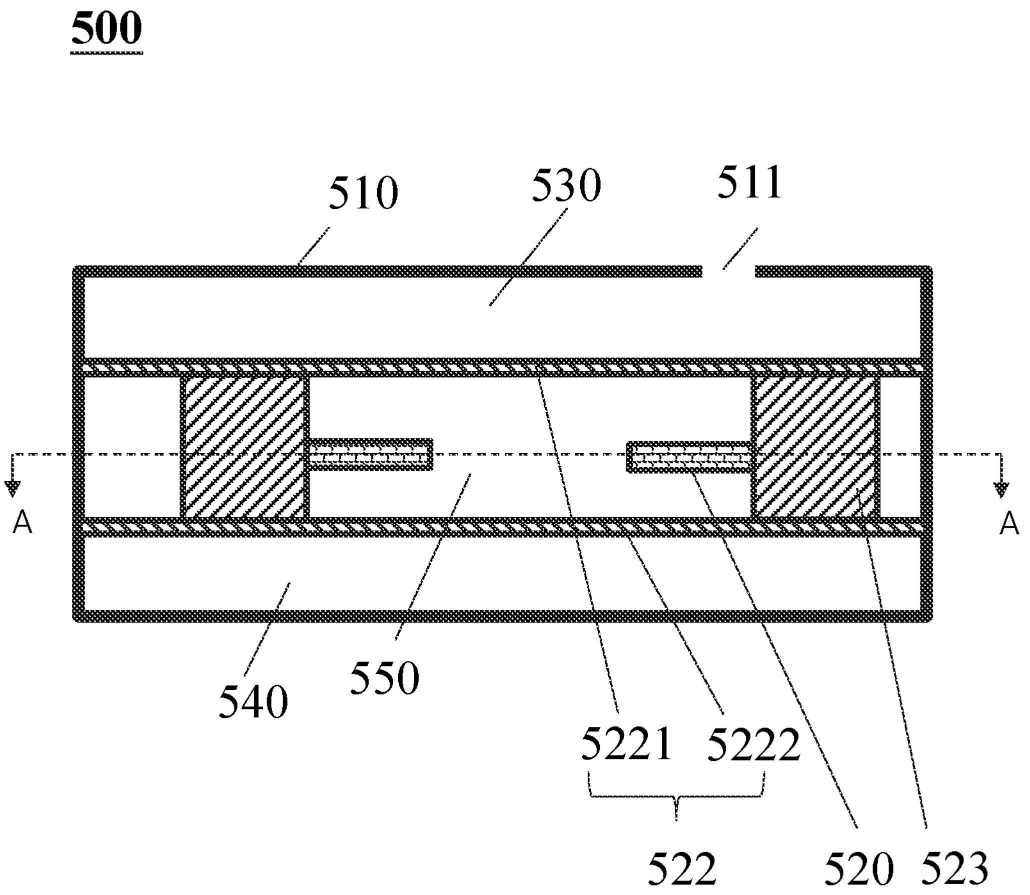
FIG. 5 is a schematic diagram illustrating a structure of a microphone according to some embodiments of the present disclosure.

FIG. 5 is a schematic diagram illustrating a structure of a microphone according to some embodiments of the present disclosure. As shown in FIG. 5, the microphone 500 may include a shell structure 510, an acoustic-electric conversion component 520, a vibration pickup portion 522, and a vibration transmission portion 523, wherein the shell structure 510 may be configured to carry the vibration pickup portion 522, the vibration transmission portion 523, and the acoustic-electric conversion component 520. In some embodiments, the shell structure 510 may be a regular structure (e.g., a cuboid, a cylinder, a frustum, etc.) or other irregular structures. In some embodiments, the shell structure 510 may be an internally hollow structure. The shell structure 510 may independently form an acoustic cavity. The vibration pickup portion 522, the vibration transmission portion 523, and the acoustic-electric conversion component 520 may be located in the acoustic cavity. In some embodiments, a material of the shell structure 510 may include but be not limited to, one or more of a metal, an alloy material, or a polymer material (e.g., acrylonitrile-butadiene-styrene copolymer, polyvinyl chloride, polycarbonate, polypropylene, etc.), etc. In some embodiments, a peripheral side of the vibration pickup portion 522 may be connected to a side wall of the shell structure 510, thereby separating the acoustic cavity formed by the shell structure 510 into a plurality of cavities, including a first acoustic cavity 530 and a second acoustic cavity 540.

In some embodiments, a side wall of the shell structure 510 corresponding to the first acoustic cavity 530 may be provided with one or more hole portions 511. The one or more hole portions 511 may be located at the first acoustic cavity 530 and guide an external sound signal into the first acoustic cavity 530. In some embodiments, the external sound signal may enter the first acoustic cavity 530 of the microphone 500 from the hole portion(s) 511 and cause the air in the first acoustic cavity 530 to generate vibration. The vibration pickup portion 522 may pick up the air vibration signal and transmit the vibration signal to the acoustic-electric conversion component 520. The acoustic-electric conversion component 520 may receive the vibration signal and convert the vibration signal into an electrical signal for output.

In some embodiments, the vibration pickup portion 522 may include a first vibration pickup portion 5221 and a second vibration pickup portion 5222 arranged from top to bottom. The first vibration pickup portion 5221 and the second vibration pickup portion 5222 may be connected to the shell structure 510 through their peripheral sides. At least a portion of the first vibration pickup portion 5221 and the second vibration pickup portion 5222 may generate vibration in response to a sound signal entering the microphone 500 through the hole portion(s) 511. In some embodiments, a material of the vibration pickup portion 522 may include but be not limited to, one or more of a semiconductor material, a metallic material, a metallic alloy, an organic material, or the like. In some embodiments, the semiconductor material may include but be not limited to, silicon, silicon dioxide, silicon nitride, silicon carbide, or the like. In some embodiments, the metallic material may include but be not limited to, copper, aluminum, chromium, titanium, gold, or the like. In some embodiments, the metallic alloy may include but be not limited to copper-aluminum alloy, copper-gold alloy, titanium alloy, aluminum alloy, or the like. In some embodiments, the organic material may include but be not limited to, polyimide, parylene, polydimethylsiloxane (PDMS), silica gel, silica, or the like. In some embodiments, a structure of the vibration pickup portion 522 may be a plate-shaped structure, a column-shaped structure, or the like.

Figure 6:
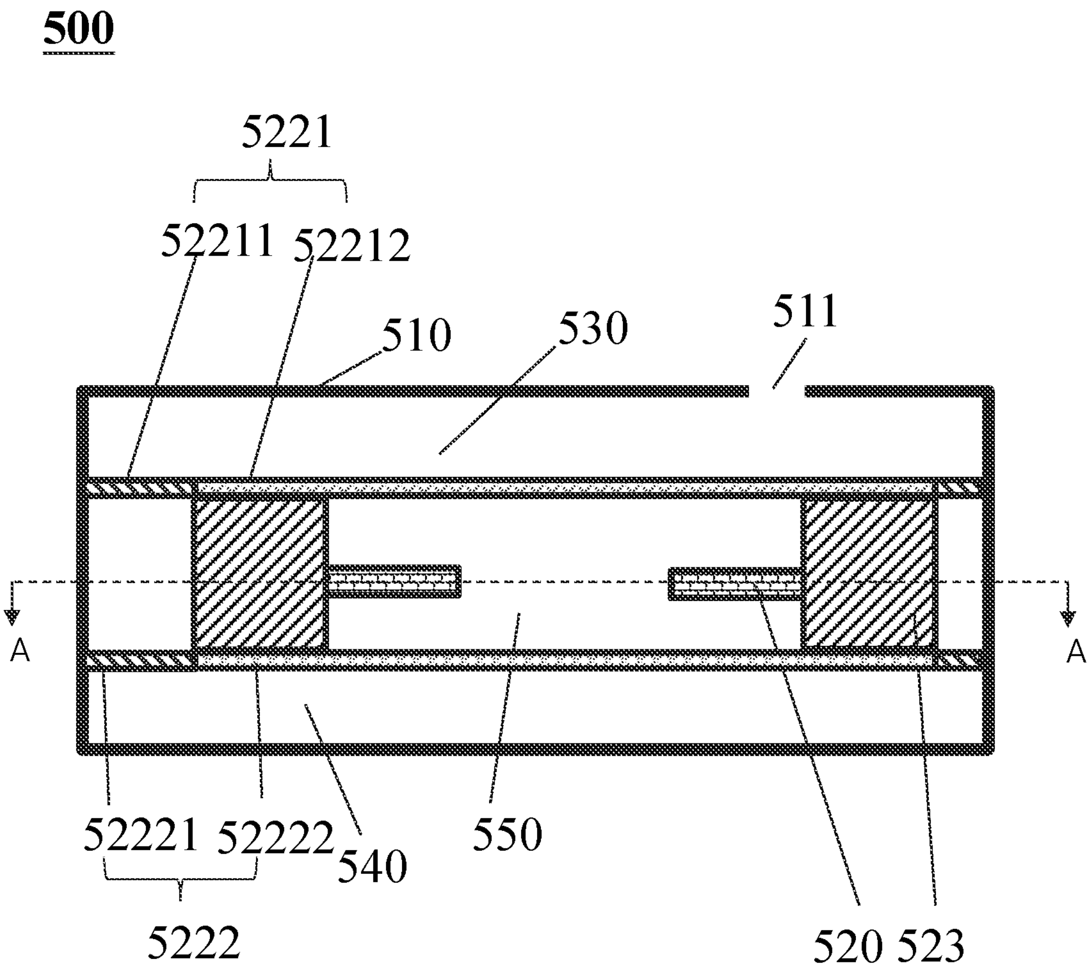
FIG. 6 is a schematic diagram illustrating a structure of a microphone according to some embodiments of the present disclosure.

In some embodiments, the vibration pickup portion 522 may include an elastic portion and a fixed portion. For example, FIG. 6 is a schematic diagram illustrating a structure of a microphone according to some embodiments of the present disclosure. As shown in FIG. 6, the first vibration pickup portion 5221 may include a first elastic portion 52211 and a first fixed portion 52212. One end of the first elastic portion 52211 may be connected to a side wall of the shell structure 510, and another end of the first elastic portion 52211 may be connected to the first fixed portion 52212 so that the first elastic portion 52211 may be connected between the first fixed portion 52212 and an inner wall of the shell structure 510. The second vibration pickup portion 5222 may include a second elastic portion 52221 and a second fixed portion 52222. One end of the second elastic portion 52221 may be connected to a side wall of the shell structure 510, and another end of the second elastic portion 52221 may be connected to the second fixed portion 52222 so that the second elastic portion 52221 may be connected between the second fixed portion 52222 and the inner wall of the shell structure 510.

In some embodiments, the vibration transmission portion 523 may be located between the first vibration pickup portion 5221 and the second vibration pickup portion 5222. An upper surface of the vibration transmission portion 523 may be connected to a lower surface of the first vibration pickup portion 5221. A lower surface of the vibration transmission portion 523 may be connected to an upper surface of the second vibration pickup portion 5222. Specifically, a vacuum cavity 550 may be formed between the vibration transmission portion 523, the first fixed portion 52212 of the first vibration pickup portion 5221, and the second fixing portion 52222 of the second vibration pickup portion 5222. The acoustic-electric conversion component 520 may be located in the vacuum cavity 550. Specifically, one end of the acoustic-electric conversion component 520 may be connected to an inner wall of the vibration transmission portion 523, and another end of the acoustic-electric conversion component 520 may be suspended in the vacuum cavity 550. In some embodiments, the vibration picked up by the vibration pickup portion 522 (e.g., the first elastic portion 52211 of the first vibration pickup portion 5221 and the second elastic portion 52221 of the second vibration pickup portion 5222) may be transmitted to the acoustic-electric conversion component 520 through the vibration transmission portion 523. In some embodiments, a material of the vibration transmission portion 523 may include but be not limited to, one or more of a semiconductor material, a metallic material, a metallic alloy, an organic material, or the like. In some embodiments, the material of the vibration transmission portion 523 and the material of the vibration pickup portion 522 may be the same or different. In some embodiments, the vibration transmission portion 523 and the vibration pickup portion 522 may be an integrally-formed structure. In some embodiments, the vibration transmission portion 523 and the vibration pickup portion 522 may be relatively independent structures. In some embodiments, the vibration transmission portion 523 may be a regular structure (e.g., a tubular structure, an annular structure, a quadrilateral, a pentagon, etc.) and/or an irregular polygon structure.

The acoustic-electric conversion component 520 may be arranged in the vacuum cavity 550, which may avoid the contact between the acoustic-electric conversion component 520 and the air in the vacuum cavity 550, solving the influence of the air vibration in the vacuum cavity 550 during the vibration process of the acoustic-electric conversion component 520, and further solving the problem of the loud background noise of the microphone 500. On the other hand, the acoustic-electric conversion component 520 may be located in the vacuum cavity 550, which may avoid the friction between the acoustic-electric conversion component 520 and the air inside the vacuum cavity 550, so as to reduce the air damping inside the vacuum cavity 550 and improve the Q value of the microphone 500. In order to improve the output effect of the microphone 500, in some embodiments, a vacuum degree in the vacuum cavity 550 may be smaller than 100 Pa. In some embodiments, the vacuum degree in the vacuum cavity 550 may be $10^{-6}$ Pa to 100 Pa. In some embodiments, the vacuum degree in the vacuum cavity 550 may be $10^{-7}$ Pa to 100 Pa.

In some embodiments, a material of the first fixed portion 52212 and a material of the second fixed portion 52222 may be different from a material of the first elastic portion 52211 and a material of the second elastic portion 52221. For example, in some embodiments, a rigidity of the fixed portion of the vibration pickup portion 522 may be greater than a rigidity of the elastic portion, that is, a rigidity of the first fixed portion 52212 may be greater than a rigidity of the first elastic portion 52211 and/or a rigidity of the second fixed portion 52222 may be greater than a rigidity of the second elastic portion 52221. The first elastic portion 52211 and/or the second elastic portion 52221 may generate the vibration in response to the external sound signal and transmit the vibration signal to the acoustic-electric conversion component 520. The first fixed portion 52212 and the second fixed portion 52222 may have a relatively large rigidity to ensure that the vacuum cavity 550 formed among the first fixed portion 52212, the second fixed portion 52222, and the vibration transmission portion 523 is free from the effect of the external air pressure. In some embodiments, in order to ensure that the vacuum cavity 550 is not affected by the external air pressure, Young's modulus of the fixed portion (e.g., the first fixed portion 52212 and the second fixed portion 52222) of the vibration pickup portion 522 may be greater than 60 GPa. In some embodiments, Young's modulus of the fixed portion (e.g., the first fixed portion 52212, the second fixed portion 52222) of the vibration pickup portion 522 may be greater than 50 GPa. In some embodiments, Young's modulus of the fixed portion (e.g., the first fixed portion 52212, the second fixed portion 52222) of the vibration pickup portion 522 may be greater than 40 GPa.

Figure 7:
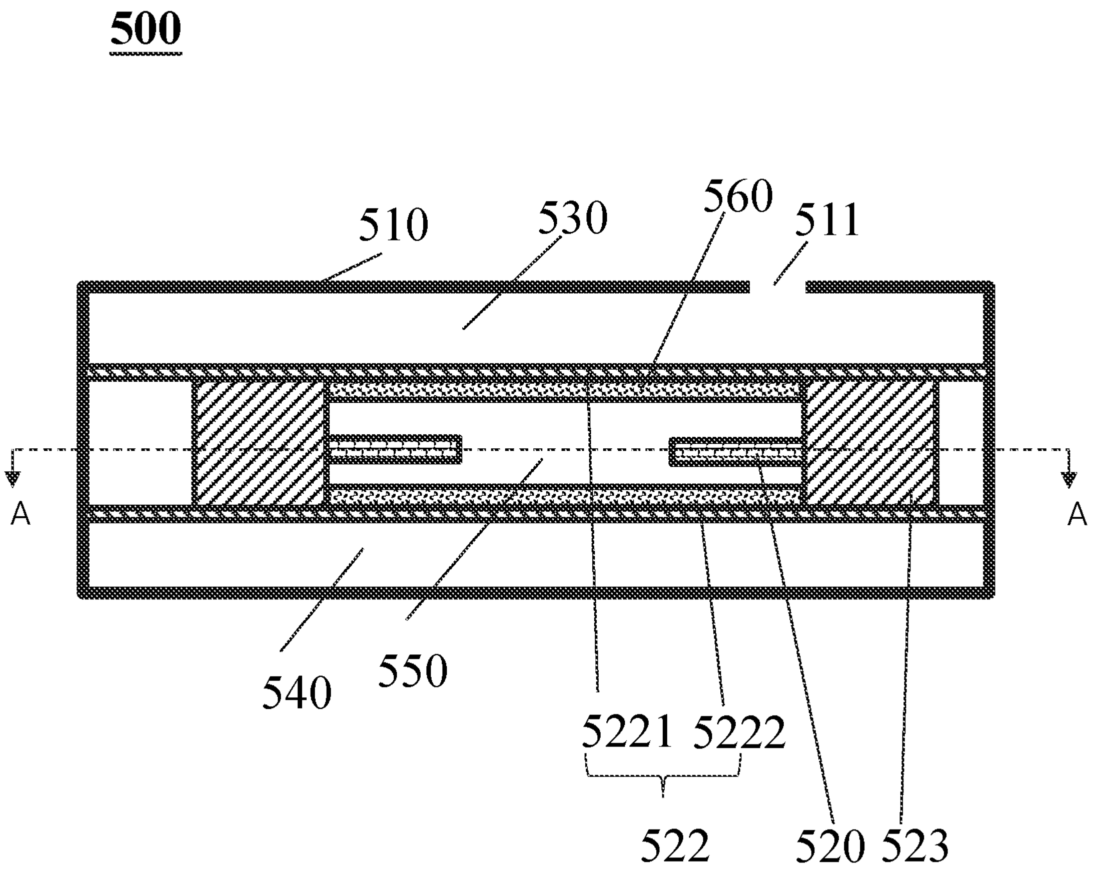
FIG. 7 is a schematic diagram illustrating a structure of a microphone according to some embodiments of the present disclosure.

In some embodiments, in order to ensure that the vacuum cavity is free from the effect of the external air pressure, the microphone may also include a reinforcing component. The reinforcing component may be located on an upper surface or a lower surface of the vibration pickup portion corresponding to the vacuum cavity, thereby improving the rigidity of the vibration pickup portion corresponding to the vacuum cavity. Merely by way of example, FIG. 7 is a schematic diagram illustrating a structure of a microphone according to some embodiments of the present disclosure. As shown in FIG. 7, the microphone 500 may also include a reinforcing component 560. The reinforcing component 560 may be located on an upper surface or a lower surface of the vibration pickup portion 522 corresponding to the vacuum cavity 550. Specifically, the reinforcing component 560 may be located on the lower surface of the first vibration pickup portion 5221 and the upper surface of the second vibration pickup portion 5222 respectively, and a peripheral side of the reinforcing component 560 may be connected to the inner wall of the vibration transmission portion 523. In some embodiments, a structure of the reinforcing component 560 may be a plate-shaped structure, a column-shaped structure, or the like. The structure of the reinforcing component 560 may be adaptively adjusted according to the shape and structure of the vibration transmission portion 523. It should be noted that a position of the reinforcing component 560 may be not limited to the interior of the vacuum cavity 550 shown in FIG. 7, but may also be located in other positions. For example, the reinforcing component 560 may also be located outside the vacuum cavity 550. Specifically, the reinforcing component 560 may be located on the upper surface of the first vibration pickup portion 5221 and the lower surface of the second vibration pickup portion 5222. As another example, the reinforcing component 560 may also be located inside and outside the vacuum cavity 550 at the same time. Specifically, the reinforcing component 560 may be located on the upper surface of the first vibration pickup portion 5221 and the upper surface of the second vibration pickup portion 5222, or the reinforcing component 560 may be located on the upper surface of the first vibration pickup portion 5221 and the lower surface of the second vibration pickup portion 5222, or the reinforcing component 560 may be located on the lower surface of the first vibration pickup portion 5221 and the lower surface of the second vibration pickup portion 5222, or the reinforcing component 560 may be located on the lower surface of the first vibration pickup portion 5221 and the upper surface of the second vibration pickup portion 5222, or the reinforcing component 560 may be located on the upper surface and the lower surface of the first vibration pickup portion 5221 and the upper surface and the lower surface of the second vibration pickup portion 5222. The positioning of the reinforcing component 560 may be not limited to the above description, and any configuration of the reinforcing component 560 which can make the vacuum cavity not affected by the external air pressure is within the protection scope of the present disclosure.

In some embodiments, in order to ensure the vacuum cavity 550 is not affected by the external air pressure, the rigidity of the reinforcing component 560 may be greater than the rigidity of the vibration pickup portion 522. In some embodiments, Young's modulus of the reinforcing component 560 may be greater than 60 GPa. In some embodiments, Young's modulus of the reinforcing component 560 may be greater than 50 GPa. In some embodiments, Young's modulus of the reinforcing component 560 may be greater than 40 GPa. In some embodiments, a material of the reinforcing component 560 may include but be not limited to, one or more of a semiconductor material, a metallic material, a metallic alloy, an organic material, or the like. In some embodiments, the semiconductor material may include but be not limited to, silicon, silicon dioxide, silicon nitride, silicon carbide, or the like. In some embodiments, the metallic material may include but be not limited to, copper, aluminum, chromium, titanium, gold, or the like. In some embodiments, the metallic alloy may include but be not limited to, copper-aluminum alloys, copper-gold alloys, titanium alloys, aluminum alloys, or the like. In some embodiments, the organic material may include but be not limited to, polyimide, parylene, polydimethylsiloxane (PDMS), silica gel, silica, or the like.

An internal air pressure of the vacuum cavity 550 may be much lower than an external air pressure of the vacuum cavity 550. By setting the reinforcing component 560 at the first vibration pickup portion 5221 and/or the second vibration pickup portion 5222 corresponding to the vacuum cavity 550, it may ensure that the vacuum cavity 550 is not affected by the external air pressure. It may also be understood that the rigidity of the first vibration pickup portion 5221 and the second vibration pickup portion 5222 corresponding to the vacuum cavity 550 may be improved by setting the reinforcing component 560, so as to avoid the deformation of the vibration pickup portion 522 corresponding to the vacuum cavity 550 under the action of the difference between the external air pressure and the internal air pressure of the vacuum cavity 550, so as to ensure that the volume of the vacuum cavity 550 remains basically constant when the microphone 500 operates. Thus, the acoustic-electric conversion component 520 in the vacuum cavity 550 may be ensured to work normally. It should be noted that a sealing device is required to provide the required vacuum degree during the production process of each component of the microphone 500 (e.g., the first vibration pickup portion 5221, the second vibration pickup portion 5222, the vibration transmission portion 523, and the acoustic-electric conversion component 520), so that the vacuum degree inside the vacuum cavity 550 is within a required range.

It should be noted that in an alternative embodiment, the vibration pickup portion 522 may include only the first vibration pickup portion 5221, and the first vibration pickup portion 5221 may be connected to the shell structure 510 through its peripheral side. The acoustic-electric conversion component 520 may be directly or indirectly connected to the first vibration pickup portion 5221. For example, the acoustic-electric conversion component 520 may be located on an upper surface or a lower surface of the first vibration pickup portion 5221. As another example, the acoustic-electric conversion component 520 may be connected to the first vibration pickup component 5221 through other structures (e.g., the vibration transmission portion 523). The first vibration pickup portion 5221 may generate the vibration in response to the sound signal entering the microphone 500 through the hole portion(s) 511. The acoustic-electric conversion component 520 may convert the vibration of the first vibration pickup portion 5221 or the vibration transmission portion 523 into the electrical signal.

Figure 8A:
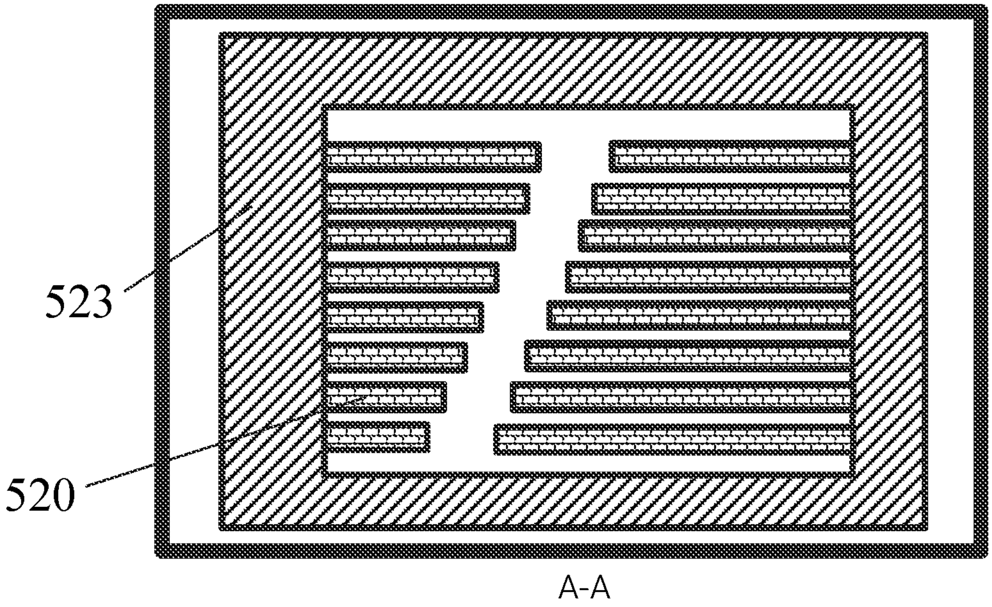
FIG. 8A is a schematic diagram illustrating a cross-sectional view of the microphone in FIG. 5 in an A-A direction.
Figure 8B:
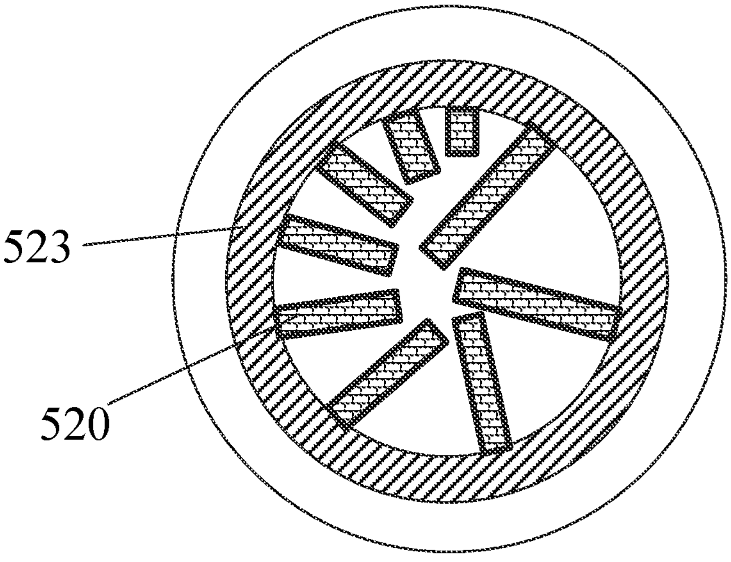
FIG. 8B is a schematic diagram illustrating a cross-sectional view of the microphone of FIG. 5 in the direction perpendicular to the A-A direction.
Figure 9A:
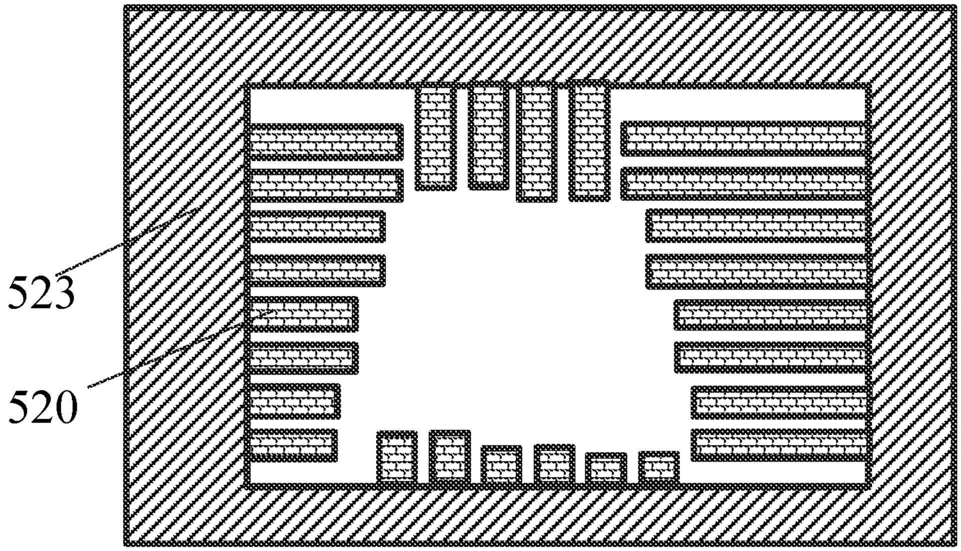
FIG. 9A is a schematic diagram illustrating a distribution of a cantilever beam structure according to some embodiments of the present disclosure.
Figure 9B:
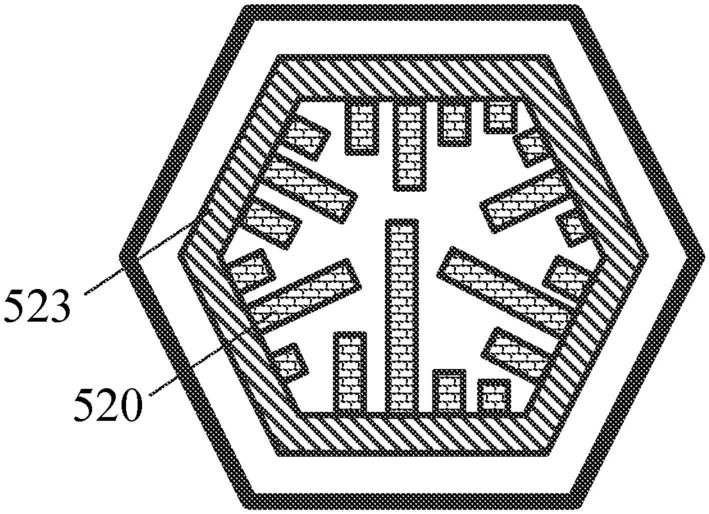
FIG. 9B is a schematic diagram illustrating a distribution of a cantilever beam structure according to some embodiments of the present disclosure.

In some embodiments, there may be one or more acoustic-electric conversion components. In some embodiments, a plurality of acoustic-electric conversion components 520 may be distributed on the inner wall of the vibration transmission portion 523 at intervals. It should be noted that the interval distribution here may refer to be along a horizontal direction (perpendicular to the A-A direction shown in FIG. 5) or a vertical direction (the A-A direction shown in FIG. 5). For example, when the vibration transmission portion 523 is an annular tubular structure, a plurality of acoustic-electric conversion components 520 may be distributed from top to bottom in the vertical direction at intervals. FIG. 8A is a schematic diagram illustrating a cross-sectional view of the microphone in FIG. 5 in the A-A direction. As shown in FIG. 8A, the plurality of acoustic-electric conversion components 520 may be sequentially distributed on the inner wall of the vibration transmission portion 523 at intervals, and may be on the same plane or approximately parallel in the horizontal direction. FIG. 8B is a schematic diagram illustrating a cross-sectional view of the microphone of FIG. 5 in a direction perpendicular to A-A. As shown in FIG. 8B, in the horizontal direction, a fixed end of each acoustic-electric conversion component 520 may be distributed on an annular inner wall of the vibration transmission portion 523 at intervals. The fixed end of the acoustic-electric conversion component 520 and the vibration transmission portion 523 may be approximately vertical. Another end of the acoustic-electric conversion component 520 (also referred to as a free end) extends towards a center of the vibration transmission portion 523 and may be suspended in the vacuum cavity 550 so that the acoustic-electric conversion component 520 may be circularly distributed in the horizontal direction. In some embodiments, when the vibration transmission portion 523 is a polygonal tubular structure (e.g., a triangle, a pentagon, a hexagon, etc.), fixed ends of the plurality of acoustic-electric conversion components 520 may also be distributed at intervals on each side wall of the vibration transmission portion 523 in the horizontal direction. FIG. 9A is a schematic diagram illustrating a distribution of the acoustic-electric conversion components along the horizontal direction according to some embodiments of the present disclosure. As shown in FIG. 9A, the vibration transmission portion 523 may have a quadrilateral structure, and the plurality of acoustic-electric conversion components 520 may be alternately distributed on four side walls of the vibration transmission portion 523. FIG. 9B is a schematic diagram illustrating a distribution of the acoustic-electric conversion components according to some embodiments of the present disclosure. As shown in FIG. 9B, the vibration transmission portion 523 may have a hexagonal structure, and the plurality of acoustic-electric conversion components 520 may be alternately distributed on six side walls of the vibration transmission portion 523. In some embodiments, the plurality of acoustic-electric conversion components 520 may be distributed at intervals on the inner wall of the vibration transmission portion 523 to improve the utilization of the space of the vacuum cavity 550, thereby reducing the overall volume of the microphone 500.

It should be noted that in the horizontal direction or the vertical direction, the plurality of acoustic-electric conversion components 520 are not limited to being distributed at intervals on all the inner walls of the vibration transmission portion 523. The plurality of acoustic-electric conversion components 520 may also be arranged on one side wall or a portion of side walls of the vibration transmission portion 523, or the plurality of acoustic-electric conversion components 520 may be on the same horizontal plane. For example, the vibration transmission portion 523 may have a cuboid structure, and the plurality of acoustic-electric conversion components 520 may be simultaneously arranged on one side wall, two opposite or adjacent side walls, or any three side walls of the cuboid structure. The distribution of the plurality of acoustic-electric conversion components 520 may be adaptively adjusted according to the count or the size of the vacuum cavity 550 and is not further limited here.

In some embodiments, the acoustic-electric conversion component 520 may include a cantilever beam structure. One end of the cantilever beam structure may be connected to the inner wall of the vibration transmission portion 523, and another end of the cantilever beam structure may be suspended in the vacuum cavity 550.

In some embodiments, the cantilever beam structure may include a first electrode layer, a piezoelectric layer, a second electrode layer, an elastic layer, and a base layer. The first electrode layer, the piezoelectric layer, and the second electrode layer may be arranged from top to bottom. The elastic layer may be located on an upper surface of the first electrode layer or a lower surface of the second electrode layer. The base layer may be located on an upper surface or a lower surface of the elastic layer. In some embodiments, an external sound signal may enter the first acoustic cavity 530 of the microphone 500 through the hole portion(s) 511 and cause the air in the first acoustic cavity 530 to generate vibration. The vibration pickup portion 522 (e.g., the first elastic portion 52211) may pick up a vibration signal and transmit the vibration signal to the acoustic-electric conversion component 520 (e.g., the cantilever beam structure) through the vibration transmission portion 523 so that the elastic layer in the cantilever beam structure deforms under the action of the vibration signal. In some embodiments, the piezoelectric layer may generate an electrical signal based on the deformation of the elastic layer. The first electrode layer and the second electrode layer may collect the electrical signal. In some embodiments, the piezoelectric layer may generate a voltage (a potential difference) based on the piezoelectric effect in response to the deformation stress of the elastic layer, and the first electrode layer and the second electrode layer may derive the voltage (electrical signal).

In some embodiments, the cantilever beam structure may also include at least one elastic layer, an electrode layer, and a piezoelectric layer. The at least one elastic layer may be located on a surface of the electrode layer, and the electrode layer may be located on an upper surface or a lower surface of the piezoelectric layer. In some embodiments, the electrode layer may include a first electrode and a second electrode. The first electrode and the second electrode may be bent into a first comb-like structure and a second comb-like structure, respectively. The first comb-like structure and the second comb-like structure may include a plurality of comb-tooth structures. There may be a certain distance between adjacent comb-tooth structures of the first comb-like structure and a certain distance between adjacent comb-tooth structures of the second comb-like structure, respectively, and the distances may be the same or different. The first comb-like structure and the second comb-like structure may cooperate to form the electrode layer. Further, the comb-tooth structures of the first comb-like structure may extend into gaps of the second comb-like structure, and the comb-tooth structures of the second comb-like structure may extend into gaps of the first comb-like structure, so as to cooperate with each other to form the electrode layer. The first comb-like structure and the second comb-like structure may cooperate with each other so that the first electrode and the second electrode may be arranged compactly but do not intersect. In some embodiments, the first comb-like structure and the second comb-like structure may extend along a length direction of the cantilever beam (e.g., a direction from the fixed end to the free end).

In some embodiments, the elastic layer may be a film-like structure or a block-like structure supported by one or more semiconductor materials. In some embodiments, the semiconductor material(s) may include but be not limited to, silicon, silicon dioxide, silicon nitride, gallium nitride, zinc oxide, silicon carbide, or the like. In some embodiments, a material of the piezoelectric layer may include a piezoelectric crystal material and a piezoelectric ceramic material. The piezoelectric crystal material refers to a piezoelectric monocrystal. In some embodiments, the piezoelectric crystal material may include rock crystal, sphalerite, boracite, tourmaline, zincite, gas, barium titanate and its derived structure crystal, $KH_2PO_4$ (potassium dihydrogen phosphate crystal), NaKC4H4O6·4H2O (seignette salt), or the like, or any combination thereof. The piezoelectric ceramic material refers to a kind of piezoelectric polycrystal, which is formed by the irregular collection of fine grains obtained from the solid-state reaction and sintering of different material powders. In some embodiments, the piezoelectric ceramic material may include Barium titanate (BT), lead zirconate titanate (PZT), lead barium lithium niobate (PBLN), modified lead titanate (PT), aluminum nitride (AlN), zinc oxide (ZnO), or the like, or any combination thereof. In some embodiments, the material of the piezoelectric layer may also be a piezoelectric polymer material, such as polyvinylidene fluoride (PVDF). In some embodiments, the first electrode layer and the second electrode layer may be of a conductive material structure. An exemplary conductive material may include a metal, an alloy material, a metal oxide material, graphene, or the like, or any combination thereof. In some embodiments, the metal and alloy material may include nickel, iron, lead, platinum, titanium, copper, molybdenum, zinc, or any combination thereof. In some embodiments, the alloy material may include a copper-zinc alloy, a copper-tin alloy, a copper-nickel-silicon alloy, a copper-chromium alloy, a copper-silver alloy, or the like, or any combination thereof. In some embodiments, the metal oxide material may include Ruthenium (IV) oxide ($RuO_2$), Manganese dioxide ($MnO_2$), lead dioxide ($PbO_2$), Nickel (II) oxide (NiO), or the like, or any combination thereof.

In some embodiments, the cantilever beam structure may also include a wire binding electrode layer (e.g., a pad layer). The wire binding electrode layer may be located on the first electrode layer and the second electrode layer, and connect the first electrode layer and the second electrode layer to an external circuit by means of external wire binding (e.g., gold wire, aluminum wire, etc.), so as to lead out the voltage signal between the first electrode layer and the second electrode layer to a back-end processing circuit. In some embodiments, a material of the wire binding electrode layer may include copper foil, titanium, copper, or the like. In some embodiments, the material of the wire binding electrode layer and the material of the first electrode layer (or the second electrode layer) may be the same. In some embodiments, the material of the wire binding electrode layer and the material of the first electrode layer (or the second electrode layer) may be different.

In some embodiments, by setting a parameter of the cantilever beam structure (e.g., a length, width, height, material, etc., of the cantilever beam structure), different cantilever beam structures may have different resonance frequencies, respectively, thereby generating different frequency responses to vibration signals of the vibration transmission portion 523. For example, by setting cantilever beam structures of different lengths, the cantilever beam structures of different lengths may have different resonance frequencies. Multiple resonance frequencies corresponding to the cantilever beam structures of different lengths may be in a range of 100 Hz-12000 Hz. Since the cantilever beam structure is sensitive to vibration near its resonance frequency, it may be considered that the cantilever beam structure has frequency selective characteristics to the vibration signal, that is, the cantilever beam structure may mainly convert a sub-band vibration signal near its resonance frequency into an electrical signal. Therefore, in some embodiments, different cantilever beam structures may have different resonance frequencies by setting different lengths, so that sub-bands are formed near each resonance frequency. For example, 11 sub-bands may be set within a frequency range of human voice through multiple cantilever beam structures. The resonance frequencies of the cantilever beam structures corresponding to the 11 sub-bands may be located at 500 HZ-700 Hz, 700 Hz-1000 Hz, 1000 Hz-1300 Hz, 1300 Hz-1700 Hz, 1700 Hz-2200 Hz, 2200 Hz-3000 Hz, 3000 Hz-3800 Hz, 3800 Hz-4700 Hz, 4700 Hz-5700 Hz, 5700 Hz-7000 Hz and 7000 Hz-12000 Hz, respectively. It should be noted that the count of sub-bands set within the frequency range of human voice through the cantilever beam structures may be adjusted in the application scenario of microphone 500, which is not further limited here.

Figure 10:
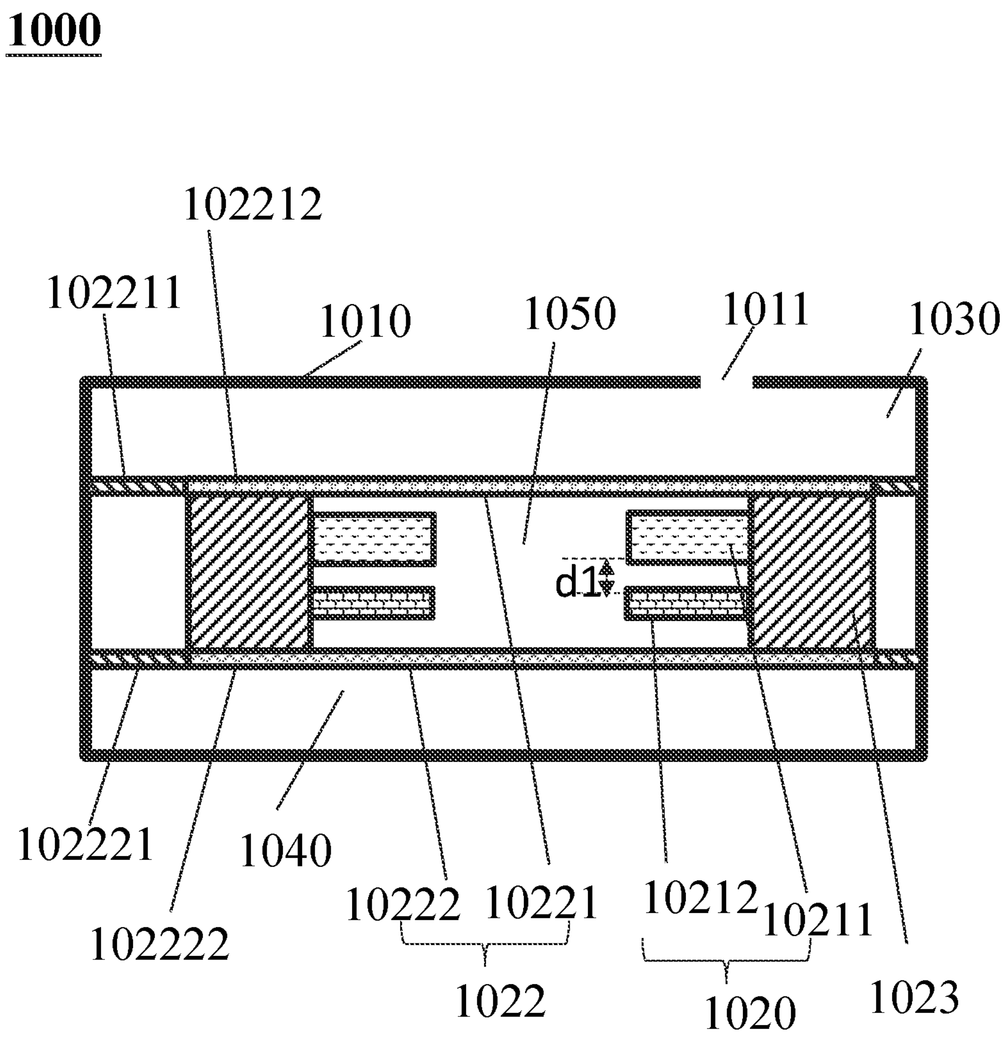
FIG. 10 is a schematic diagram illustrating a structure of a microphone according to some embodiments of the present disclosure.

FIG. 10 is a schematic diagram illustrating a structure of a microphone according to some embodiments of the present disclosure. As shown in FIG. 10, the microphone 1000 may include a shell structure 1010, an acoustic-electric conversion component 1020, a vibration pickup portion 1022, and a vibration transmission portion 1023. The microphone 1000 shown in FIG. 10 may be the same as or similar to the microphone 500 shown in FIGS. 5 and 6. For example, the shell structure 1010 of the microphone 1000 may be the same as or similar to the shell structure 510 of the microphone 500. As another example, a first acoustic cavity 1030, a second acoustic cavity 1040, and a vacuum cavity 1050 of the microphone 1000 may be the same as or similar to the first acoustic cavity 530, the second acoustic cavity 540, and the vacuum cavity 550 of the microphone 500, respectively. As a further example, a vibration pickup portion 1022 (e.g., a first vibration pickup portion 10221 such as a first elastic portion 102211, a first fixed portion 102212, and a second vibration pickup portion 10222 such as a second elastic portion 102221, a second fixed portion 102222) of the microphone 1000 may be the same as or similar to the vibration pickup portion 522 (e.g., the first vibration pickup portion 5221 such as the first elastic portion 52211, the first fixed portion 52212, and the second vibration pickup portion 5222 such as the second elastic portion 52221, the second fixed portion 52222) of the microphone 500. More portions of the microphone 1000 (e.g., hole portion(s) 1011, the vibration transmission portion 1023, etc.), reference may be made to FIGS. 5 and 6 and their related descriptions.

In some embodiments, the main difference between the microphone 1000 shown in FIG. 10 and the microphone 500 shown in FIG. 5 may be that the acoustic-electric conversion component 1020 of the microphone 1000 may include a first cantilever beam structure 10211 and a second cantilever beam structure 10212. The first cantilever beam structure 10211 and the second cantilever beam structure 10212 herein may be considered as two electrode plates. Fixed ends of the first cantilever beam structure 10211 and the second cantilever beam structure 10212 corresponding to the acoustic-electric conversion component 1020 may be connected to an inner wall of the vibration transmission portion 1023, and another ends (also referred to as free ends) of the first cantilever beam structure 10211 and the second cantilever beam structure 10212 may be suspended in the vacuum cavity 1050. In some embodiments, the first cantilever beam structure 10211 and the second cantilever beam structure 10212 may be arranged opposite, and the first cantilever beam structure 10211 and the second cantilever beam structure 10212 may have a facing area. In some embodiments, the first cantilever beam structure 10211 and the second cantilever beam structure 10212 may be arranged vertically. In this case, the facing area may be understood as an area where the lower surface of the first cantilever beam structure 10211 is opposite to the upper surface of the second cantilever beam structure 10212. In some embodiments, the first cantilever beam structure 10211 and the second cantilever beam structure 10212 may have a first gap d1. After receiving a vibration signal from the vibration transmission portion 1023, the first cantilever beam structure 10211 and the second cantilever beam structure 10212 may generate different degrees of deformation in their vibration direction (i.e., an extension direction of the first gap d1) so that the first gap d1 changes. The first cantilever beam structure 10211 and the second cantilever beam structure 10212 may convert the received vibration signal of the vibration transmission portion 1023 into an electrical signal based on the change of the first gap d1.

In order to make the first cantilever beam structure 10211 and the second cantilever beam structure 10212 generate deformation of different degrees in the vibration direction, in some embodiments, a rigidity of the first cantilever beam structure 10211 and a rigidity of the second cantilever beam structure 10212 may be different. Under the action of the vibration signal of the vibration transmission portion 1023, a cantilever beam structure with a smaller rigidity may produce a certain degree of deformation, and a cantilever beam structure with a larger rigidity may be approximately considered not to generate deformation or generate deformation of a smaller degree than that of the deformation generated by the cantilever beam structure with the smaller rigidity. In some embodiments, when the microphone 1000 is in a working state, the cantilever beam structure with the smaller rigidity (e.g., the second cantilever beam structure 10212) may deform in response to the vibration of the vibration transmission portion 1023, and the cantilever beam structure with the larger rigidity (e.g., the first cantilever beam structure 10211) may vibrate with the vibration transmission unit 1023 without deformation so that the first gap d1 changes.

In some embodiments, the resonance frequency of the cantilever beam structure with the smaller rigidity in the acoustic-electric conversion component 1020 may be within a frequency range hearing by the human ear (e.g., within 12000 Hz). In some embodiments, the resonance frequency of the cantilever beam structure with the larger rigidity in the acoustic-electric conversion component 1020 may be within a frequency range insensitive to the human ear (e.g., greater than 12000 Hz). In some embodiments, the rigidity of the first cantilever beam structure 10211 (or the second cantilever beam structure 10212) in the acoustic-electric conversion component 1020 may be achieved by adjusting a material, length, width, or thickness of the first cantilever beam structure 10211 (or the second cantilever beam structure 10212). In some embodiments, different frequency responses corresponding to different resonance frequencies may be obtained by adjusting the parameters of each group of cantilever beam structures corresponding to the acoustic-electric conversion component 1020 (e.g., the material, thickness, length, width, etc. of the cantilever beam structure).

Figure 11:
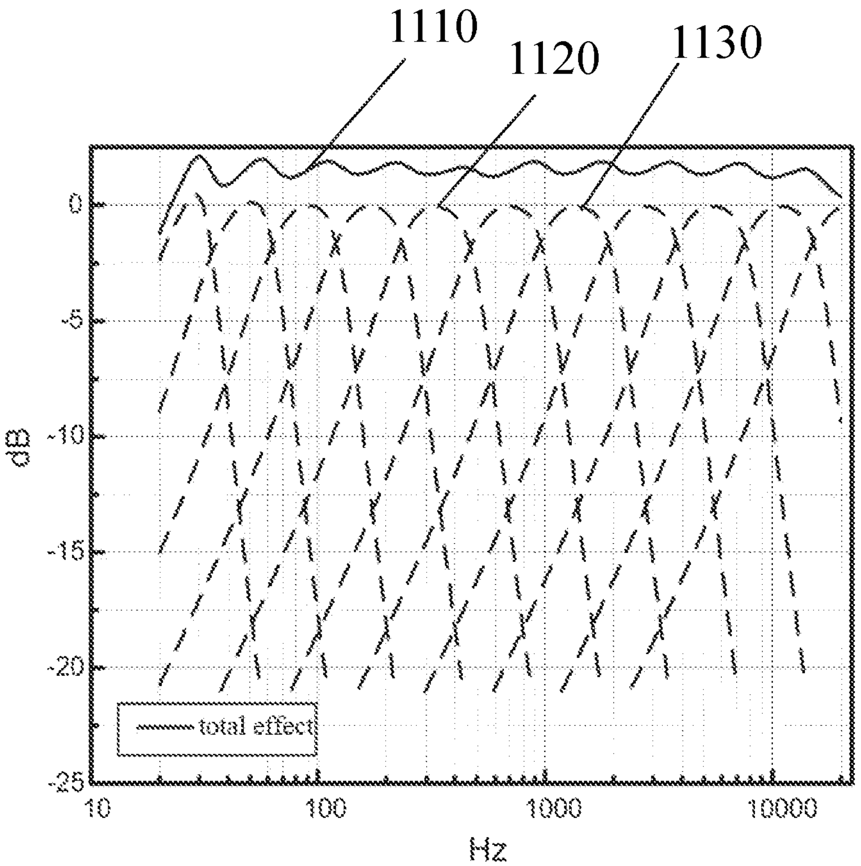
FIG. 11 is a schematic diagram illustrating frequency response curves of a microphone according to some embodiments of the present disclosure.

FIG. 11 is a schematic diagram illustrating frequency response curves of a microphone according to some embodiments of the present disclosure. As shown in FIG. 11, the horizontal axis refers to frequency, the unit is Hz, and the vertical axis refers to frequency response of a sound signal output from the microphone, the unit is dB. The microphone here may refer to the microphone 500, the microphone 1000, the microphone 1200, the microphone 1300, the microphone 1500, the microphone 1600, the microphone 1700, the microphone 2000, the microphone 2100, the microphone 2200, etc. The dotted lines in FIG. 11 may refer to corresponding frequency response curves of each acoustic-electric conversion component of the microphone. According to the frequency response curves in FIG. 11, each acoustic-electric conversion component may have its own resonance frequency (e.g., a resonance frequency of a frequency response curve 1120 is about 350 Hz, and a resonance frequency of a frequency response curve 1130 is about 1500 Hz). When the external sound signal is transmitted to the microphone, different acoustic-electric conversion components may be more sensitive to the vibration signal near their own resonance frequencies. Therefore, an electrical signal output by each acoustic-electric conversion component mainly may include a sub-band signal corresponding to its resonance frequency. In some embodiments, the output at the resonance peak of each acoustic-electric conversion component may be much larger than the output of its own flat area. By selecting the frequency band close to the resonance peak in the frequency response curve of each acoustic-electric conversion component, a sub-band frequency division of the full band signal corresponding to the sound signal may be realized. In some embodiments, a flatter frequency response curve 1110 of the microphone with a higher signal-to-noise ratio may be obtained by fusing the frequency response curves in FIG. 11. In addition, the resonance peaks in different frequency ranges may be added to the microphone system by setting different acoustic-electric conversion components (e.g., the cantilever beam structures), which improves the sensitivity of the microphone near multiple resonance peaks and further improves the sensitivity of the microphone in the whole broadband.

The filtering and frequency band decomposition of vibration signals may be achieved by setting multiple acoustic-electric conversion components in the microphone and utilizing the characteristics of acoustic-electric conversion components (e.g. the cantilever beam structures) with different resonance frequencies, avoiding the problems of signal distortion and noise introduction caused by complexity of a filtering circuit in the microphone and high computing resource occupation of software algorithms, and further reducing the complexity and production cost of the microphone.

Figure 12:
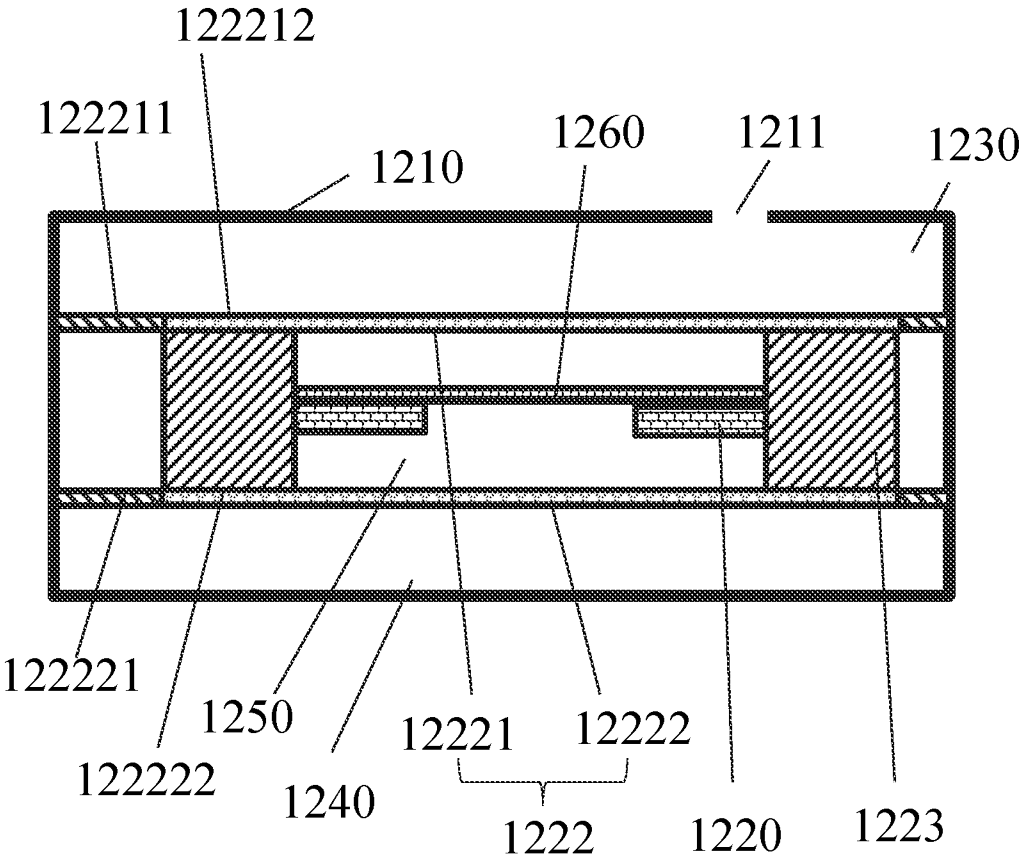
FIG. 12 is a schematic diagram illustrating a structure of a microphone according to some embodiments of the present disclosure.

FIG. 12 is a schematic diagram illustrating a microphone according to some embodiments of the present disclosure. As shown in FIG. 12, the microphone 1200 may include a shell structure 1210, an acoustic-electric conversion component 1220, a vibration transmission portion 1223, and a vibration pickup portion 1222. The microphone 1200 shown in FIG. 12 may be the same as or similar to the microphone 500 shown in FIGS. 5 and 6. For example, the shell structure 1210 of the microphone 1200 may be the same as or similar to the shell structure 510 of the microphone 500. As another example, a first acoustic cavity 1230, a second acoustic cavity 1240, and a vacuum cavity 1250 of the microphone 1200 may be the same as or similar to the first acoustic cavity 530, the second acoustic cavity 540, and the vacuum cavity 550 of the microphone 500, respectively. As another example, the vibration pickup portion 1222 (e.g., a first vibration pickup portion 12221 such as a first elastic portion 122211, a first fixed portion 122212, and a second vibration pickup portion 12222 such as a second elastic portion 122221, a second fixed portion 122222) of the microphone 1200 may be the same as or similar to the vibration pickup portion 522 (e.g., the first vibration pickup portion 5221 such as the first elastic portion 52211, the first fixed portion 52212, and the second vibration pickup portion 5222 such as the second elastic portion 52221, the second fixed portion 52222) of the microphone 500. For more structures of the microphone 1200 (e.g., the hole portion(s) 1211, the vibration transmission portion 1223, the acoustic-electric conversion component 1220, etc.), reference may be made to FIGS. 5 and 6 and their related descriptions.

In some embodiments, the main difference between the microphone 1200 shown in FIG. 12 and the microphone 500 shown in FIG. 5 may be that the microphone 1200 may also include one or more film structures 1260. In some embodiments, the film structure(s) 1260 may be located on an upper surface and/or lower surface of the acoustic-electric conversion component 1220. For example, the film structure(s) 1260 may be a single-layer film structure, and the film structure(s) 1260 may be located on the upper surface or lower surface of the acoustic-electric conversion component 1220. As another example, the film structure(s) 1260 may be a double-layer film. The film structure(s) 1260 may include a first film structure located on the upper surface of the acoustic-electric conversion component 1220 and a second film structure located on the lower surface of the acoustic-electric conversion component 1220. A resonance frequency of the acoustic-electric conversion component 1220 may be adjusted by setting the film structure 1260 on the surface of the acoustic-electric conversion component 1220. In some embodiments, the resonance frequency of the acoustic-electric conversion component 1220 may be affected by adjusting a material, size (such as length, width), thickness, or the like, of the film structure(s) 1260. On the one hand, parameter information (e.g., the material, size, thickness, etc.) of the film structure(s) 1260 and the acoustic-electric conversion component 1220 (e.g., a cantilever beam structure) may be adjusted so that each acoustic-electric conversion component 1220 may generate resonance within a required frequency range. On the other hand, the film structure 1260 may be disposed on the surface of the acoustic-electric conversion component 1220, thereby avoiding the damage to the acoustic-electric conversion component 1220 caused by the microphone 1200 under an overload condition, thereby improving the reliability of the microphone 1200.

In some embodiments, the film structure(s) 1260 may wholly or partially cover the upper surface and/or the lower surface of the acoustic-electric conversion component 1220. For example, the upper surface or the lower surface of each acoustic-electric conversion component 1220 may be covered with a corresponding film structure 1260, the film structure 1260 may wholly cover the upper surface or the lower surface of the corresponding acoustic-electric conversion component 1220, or the film structure 1260 may partially cover the upper surface or the lower surface of the corresponding acoustic-electric conversion component 1220. As another example, in the horizontal direction, when a plurality of acoustic-electric conversion components 1220 are located in the same horizontal plane at the same time, one film structure 1260 may cover all upper surfaces or lower surfaces of the plurality of acoustic-electric conversion components 1220 in the same horizontal plane at the same time. For example, the film structure 1260 here may be connected to the inner wall of the vibration transmission portion 1223 through its peripheral side, thereby separating the vacuum cavity 1250 into two mutually independent vacuum cavities. As another example, the shape of the film structure 1260 may be the same as the cross-sectional shape of the vibration transmission portion 1223. The film structure 1260 may be connected to the inner wall of the vibration transmission portion 1223 through its peripheral side, and the middle of the film structure 1260 may include a hole portion (not shown in FIG. 12). The film structure 1260 may partially cover the upper surface or lower surface of the plurality of acoustic-electric conversion components 1220 in the same horizontal plane at the same time so that the vacuum cavity 1250 may be separated into two vacuum cavities communicated up and down by the film structure 1260.

In some embodiments, the material of the film structure 1260 may include but be not limited to, one or more of a semiconductor material, a metallic material, a metallic alloy, an organic material, or the like. In some embodiments, the semiconductor material may include but be not limited to silicon, silicon dioxide, silicon nitride, silicon carbide, or the like. In some embodiments, the metallic material may include but be not limited to copper, aluminum, chromium, titanium, gold, or the like. In some embodiments, the metallic alloy may include but be not limited to copper-aluminum alloy, copper alloy, titanium alloy, aluminum alloy, or the like. In some embodiments, the organic material may include but be not limited to polyimide, parylene, polydimethylsiloxane (PDMS), silica gel, silica, or the like.

Figure 13:
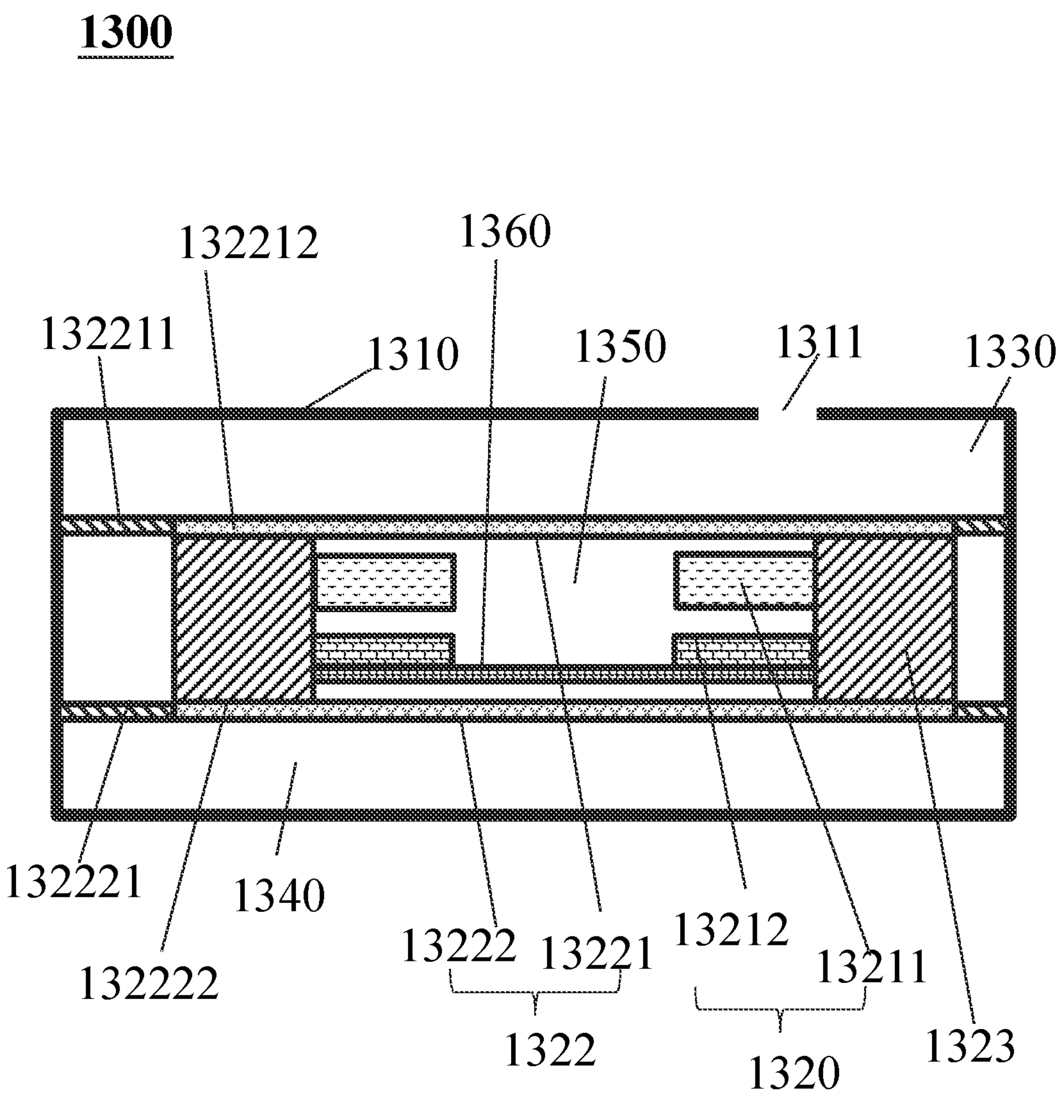
FIG. 13 is a schematic diagram illustrating a structure of a microphone according to some embodiments of the present disclosure.

FIG. 13 is a schematic diagram illustrating a structure of a microphone according to some embodiments of the present disclosure. The microphone 1300 shown in FIG. 13 may be the same as or similar to the microphone 1000 shown in FIG. 10. For example, a first acoustic cavity 1330, a second acoustic cavity 1340, and a vacuum cavity 1350 of the microphone 1300 may be the same as or similar to the first acoustic cavity 1030, the second acoustic cavity 1040, and the vacuum cavity 1050 of the microphone 1000, respectively. As another example, a vibration pickup portion 1322 (e.g., a first vibration pickup portion 13221 such as a first elastic portion 132211, a first fixed portion 132212, and a second vibration pickup portion 13222 such as a second elastic portion 132221, a second fixed portion 132222) of the microphone 1300 may be the same as or similar to the vibration pickup portion 1022 (e.g., the first vibration pickup portion 10221 such as the first elastic portion 102211, the first fixed portion 102212, and the second vibration pickup portion 10222 such as the second elastic portion 102221, the second fixed portion 102222) of the microphone 1000. For more structures of the microphone 1300 (e.g., a shell structure 1310, a hole portion 1311, a vibration transmission portion 1323, an acoustic-electric conversion component 1320, etc.), reference may be made to FIG. 10 and its related descriptions.

In some embodiments, the main difference between the microphone 1300 shown in FIG. 13 and the microphone 1200 shown in FIG. 10 may be that the microphone 1300 may also include one or more film structures 1360. In some embodiments, the film structure(s) 1360 may be located on an upper surface and/or a lower surface of a cantilever beam structure (e.g., a second cantilever beam structure 13212) having a smaller rigidity of the acoustic-electric conversion component 1320. For example, the film structure(s) 1360 may be a single-layer film structure, and the film structure(s) 1360 may be located on an upper surface or lower surface of the second cantilever beam structure 13212. As another example, the film structure 1360 may be a double-layer film, and the film structure 1360 may include a first film structure on the upper surface of the second cantilever beam structure 13212 and a second film structure on the lower surface of the second cantilever beam structure 13212. In some embodiments, the film structure(s) 1360 may wholly or partially cover the upper surface and/or the lower surface of the second cantilever beam structure 13212. For example, the upper surface or the lower surface of each second cantilever beam structure 13212 may be covered by a corresponding film structure 1360, which may wholly cover the upper surface or lower surface of the corresponding second cantilever beam structure 13212, or the film structure 1360 may partially cover the upper surface or lower surface of the corresponding second cantilever beam structure 13212. More information of the film structure(s) 1360 wholly or partially covering the upper surface and lower surface of the second cantilever beam structure 13212 refers to FIG. 12 and its related descriptions.

In some embodiments, the film structure(s) 1360 may also be located on the upper surface and/or the lower surface of a cantilever beam structure (e.g., a first cantilever beam structure 13211) with greater rigidity of the acoustic-electric conversion component 1320. The manner in which the film structure 1360 is located on the upper surface and/or the lower surface of the first cantilever beam structure 13211 may be similar to the manner in which the film structure 1360 is located on the upper surface and/or the lower surface of the second cantilever beam structure 13212, and is not repeated here.

Figure 14:
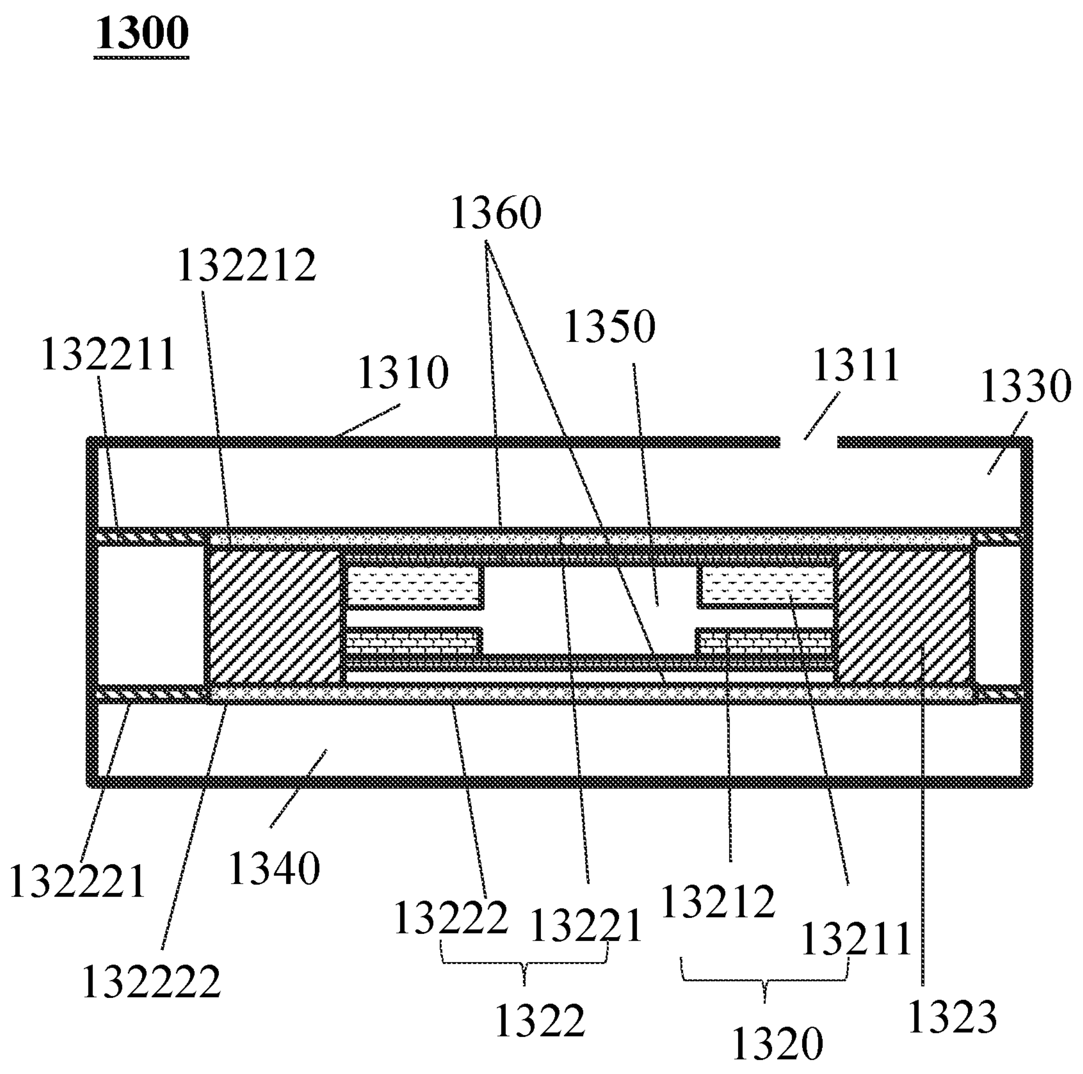
FIG. 14 is a schematic diagram illustrating a structure of a microphone according to some embodiments of the present disclosure.

In some embodiments, the film structure(s) 1360 may also be simultaneously located on the upper surface and/or lower surface of a cantilever beam structure (e.g., the second cantilever beam structure 13212) with a smaller rigidity and a cantilever beam structure (e.g., the first cantilever beam structure 13211) with a larger rigidity of the acoustic-electric conversion component 1320. For example, FIG. 14 is a schematic diagram illustrating a structure of a microphone according to some embodiments of the present disclosure. As shown in FIG. 14, the film structure(s) 1360 may be located on the upper surface of the first cantilever beam structure 13211 and the lower surface of the second cantilever beam structure 13212 at the same time. In some embodiments, the film structure(s) 1360 may be provided on the upper surface and/or the lower surface of the cantilever beam structure (e.g., the first cantilever beam structure 13211) with large rigidity, so that the cantilever beam structure with large rigidity may do not deform relative to the vibration transmission portion 1323, and the sensitivity of the microphone 1300 may be improved.

It should be noted that the corresponding vibration pickup portions in the microphone 1000 shown in FIG. 10, the microphone 1200 shown in FIG. 12, and the microphone 1300 shown in FIG. 13 and FIG. 14 may be not limited to ensuring the stability of the vacuum cavity by setting fixed portions and elastic portions with different rigidity. In some embodiments, the stability of the vacuum cavity may also be ensured by setting a reinforcing component at the vibration pickup portion corresponding to the vacuum cavity, and the description of the reinforcing component refers to FIG. 7 and its related descriptions, which are not repeated here.

Figure 15:
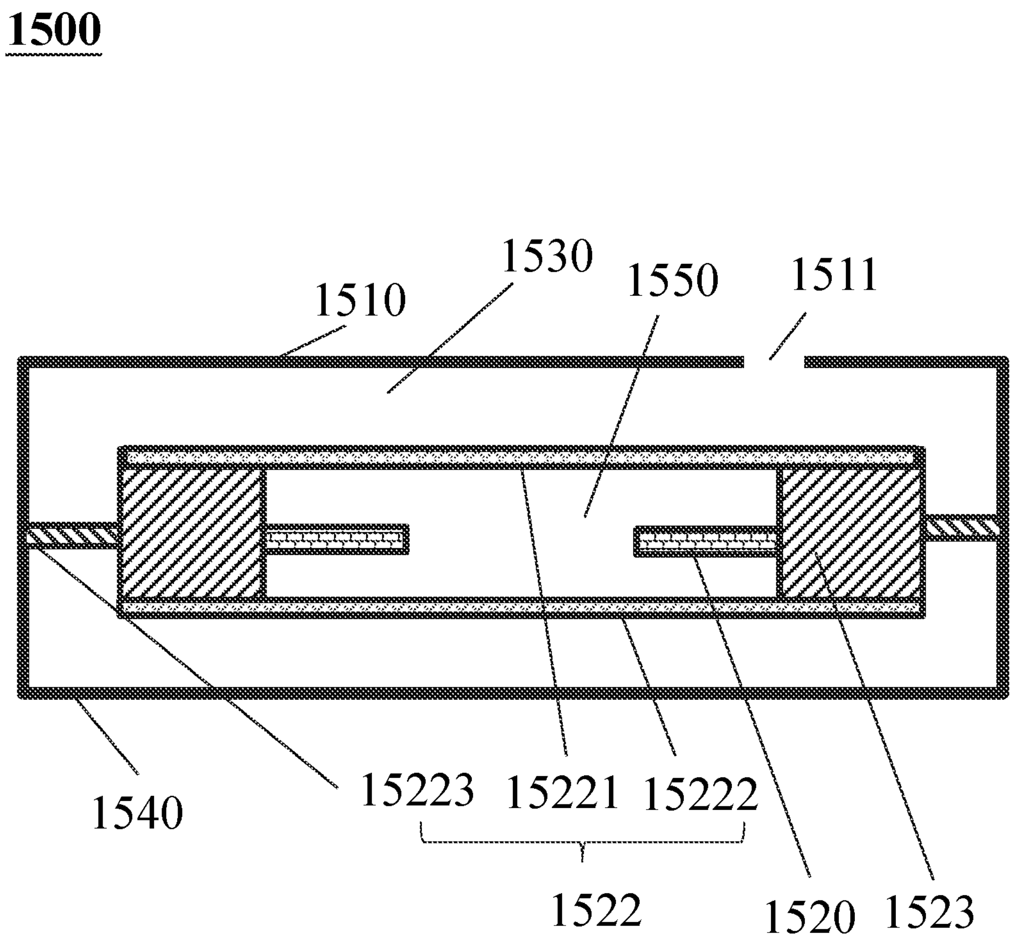
FIG. 15 is a schematic diagram illustrating a structure of a microphone according to some embodiments of the present disclosure.

FIG. 15 is a schematic diagram illustrating an exemplary structure of a microphone according to some embodiments of the present disclosure. As shown in FIG. 15, the microphone 1500 may include a shell structure 1510, an acoustic-electric conversion component 1520, a vibration pickup portion 1522, and a vibration transmission portion 1523. The microphone 1500 shown in FIG. 15 may be the same as or similar to the microphone 500 shown in FIG. 5. For example, the first acoustic cavity 1530, the second acoustic cavity 1540, and the vacuum cavity 1550 of the microphone 1500 may be the same as or similar to the first acoustic cavity 530, the second acoustic cavity 540, and the vacuum cavity 550 of the microphone 500, respectively. For more structures of the microphone 1500 (e.g., the shell structure 1510, a hole portion 1511, the vibration transmission portion 1523, the acoustic-electric conversion component 1520, etc.), reference may be made to FIG. 5 and its related descriptions.

In some embodiments, the main difference between the microphone 1500 shown in FIG. 15 and the microphone 500 shown in FIG. 5 may be the vibration pickup portion 1522. In some embodiments, the vibration pickup portion 1522 may include a first vibration pickup portion 15221, a second vibration pickup portion 15222, and a third vibration pickup portion 15223. In some embodiments, the first vibration pickup portion 15221 and the second vibration pickup portion 15222 may be disposed opposite to each other with respect to the vibration transmission portion 1523, so that the vibration transmission portion 1523 may be located between the first vibration pickup portion 15221 and the second vibration pickup portion 15222. Specifically, the lower surface of the first vibration pickup portion 15221 may be connected to the upper surface of the vibration transmission portion 1523, and the upper surface of the second vibration pickup portion 15222 may be connected to a lower surface of the vibration transmission portion 1523. In some embodiments, the first vibration pickup portion 15221, the second vibration pickup portion 15222, and the vibration transmission portion 1523 may form a vacuum cavity 1550, and the acoustic-electric conversion component 1520 may be located in the vacuum cavity 1550. In some embodiments, the third vibration pickup portion 15223 may be connected between the vibration transmission portion 1523 and the inner wall of the shell structure 1510. When the microphone 1500 operates, the sound signal may enter the first acoustic cavity 1530 through the hole portion(s) 1511 and act on the vibration pickup portion 1522, causing the third vibration pickup portion 15223 to generate vibration. The third vibration pickup portion 15223 may transmit the vibration to the acoustic-electric conversion component 1520 through the vibration transmission portion 1523.

In some embodiments, the third vibration pickup portion 15223 may include one or more film structures. The film structures may be adapted to the vibration transmission portion 1523 and the shell structure 1510. For example, when the shell structure 1510 and the vibration transmission portion 1523 are both cylindrical structures, the third vibration pickup portion 15223 may be an annular film structure. The outer wall on the peripheral side of the annular film structure may be connected to the shell structure 1510. The inner wall on the peripheral side of the annular film structure may be connected to the vibration transmission portion 1523. As another example, when the shell structure 1510 is a cylindrical structure and the vibration transmission portion 1523 is a cuboid structure, the third vibration pickup portion 15223 may be a circular film structure with a rectangular hole in the center. The outer wall of the film structure may be connected to the shell structure 1510. The inner wall of the film structure may be connected to the vibration transmission portion 1523. It should be noted that the shape of the third vibration pickup portion 15223 may be not limited to the aforementioned annular and rectangle, but may also be a film structure with other shapes, such as a regular shape (e.g., pentagon, hexagon) and/or an irregular shape. The shape and structure of the third vibration pickup portion 15223 may be adaptively adjusted according to the shape of the shell structure 1510 and the vibration transmission portion 1523.

In some embodiments, the material of the third vibration pickup portion 15223 may include but be not limited to, one or more of a semiconductor material, a metallic material, a metallic alloy, an organic material, or the like. In some embodiments, the semiconductor material may include but be not limited to silicon, silicon dioxide, silicon nitride, silicon carbide, or the like. In some embodiments, the metallic material may include but be not limited to copper, aluminum, chromium, titanium, gold, or the like. In some embodiments, the metallic alloy may include but be not limited to copper-aluminum alloy, copper-gold alloy, titanium alloy, aluminum alloy, or the like. In some embodiments, the organic material may include but be not limited to polyimide, parylene, polydimethylsiloxane (PDMS), silica gel, silica, or the like.

In some embodiments, the materials of the first vibration pickup portion 15221 and the second vibration pickup portion 15222 may be different from the material of the third vibration pickup portion 15223. For example, in some embodiments, the rigidity of the first vibration pickup portion 15221 and a rigidity of the second vibration pickup portion 15222 may be greater than the rigidity of the third vibration pickup portion 15223. In some embodiments, the third vibration pickup portion 15223 may generate vibration in response to an external sound signal and transmit the vibration signal to the acoustic-electric conversion component 1520. The first vibration pickup portion 15221 and the second vibration pickup portion 15222 may have a large rigidity to ensure that the vacuum cavity 1550 formed by the first vibration pickup portion 15221, the second vibration pickup portion 15222, and the vibration transmission portion 1523 may not be influenced by the external air pressure. In some embodiments, in order to ensure that the vacuum cavity 1550 is not affected by the external air pressure, Young's modulus of the first vibration pickup portion 15221 and Young's modulus of the second vibration pickup portion 15222 may be greater than 60 GPa. In some embodiments, Young's modulus of the first vibration pickup portion 15221 and Young's modulus of the second vibration pickup portion 15222 may be greater than 50 GPa. In some embodiments, Young's modulus of the first vibration pickup portion 15221 and Young's modulus of the second vibration pickup portion 15222 may be greater than 40 GPa.

In some embodiments, in order to ensure that the vacuum cavity 1550 may be not affected by the external air pressure, the microphone 1500 may also include a reinforcing component (not shown in the figures), the reinforcing component may be located on the upper surface or lower surface of the vibration pickup portion 1522 (e.g., the first vibration pickup portion 15221 and the second vibration pickup portion 15222) corresponding to the vacuum cavity 1550. Specifically, the reinforcing component may be located on the lower surface of the first vibration pickup portion 15221 and the upper surface of the second vibration pickup portion 15222, respectively. The peripheral side of the reinforcing component may be connected to the inner wall of the vibration transmission portion 1523. For the specific content of the structure, position, material, or the like, of the reinforcing component, reference may be made to FIG. 7 and its related descriptions. In addition, the reinforcing component may also be used in other embodiments of the present disclosure, for example, the microphone 1600 shown in FIG. 16, the microphone 1700 shown in FIG. 17, the microphone 2000 shown in FIG. 20, the microphone 2100 shown in FIG. 21, and the microphone 2200 shown in FIG. 22.

In some embodiments, the microphone 1500 may also include at least one film structure (not shown) located on the upper surface and/or lower surface of the acoustic-electric conversion component 1520. The details of the at least one film structure may be referred to FIG. 12 and its related descriptions, which are not repeated here.

Figure 16:
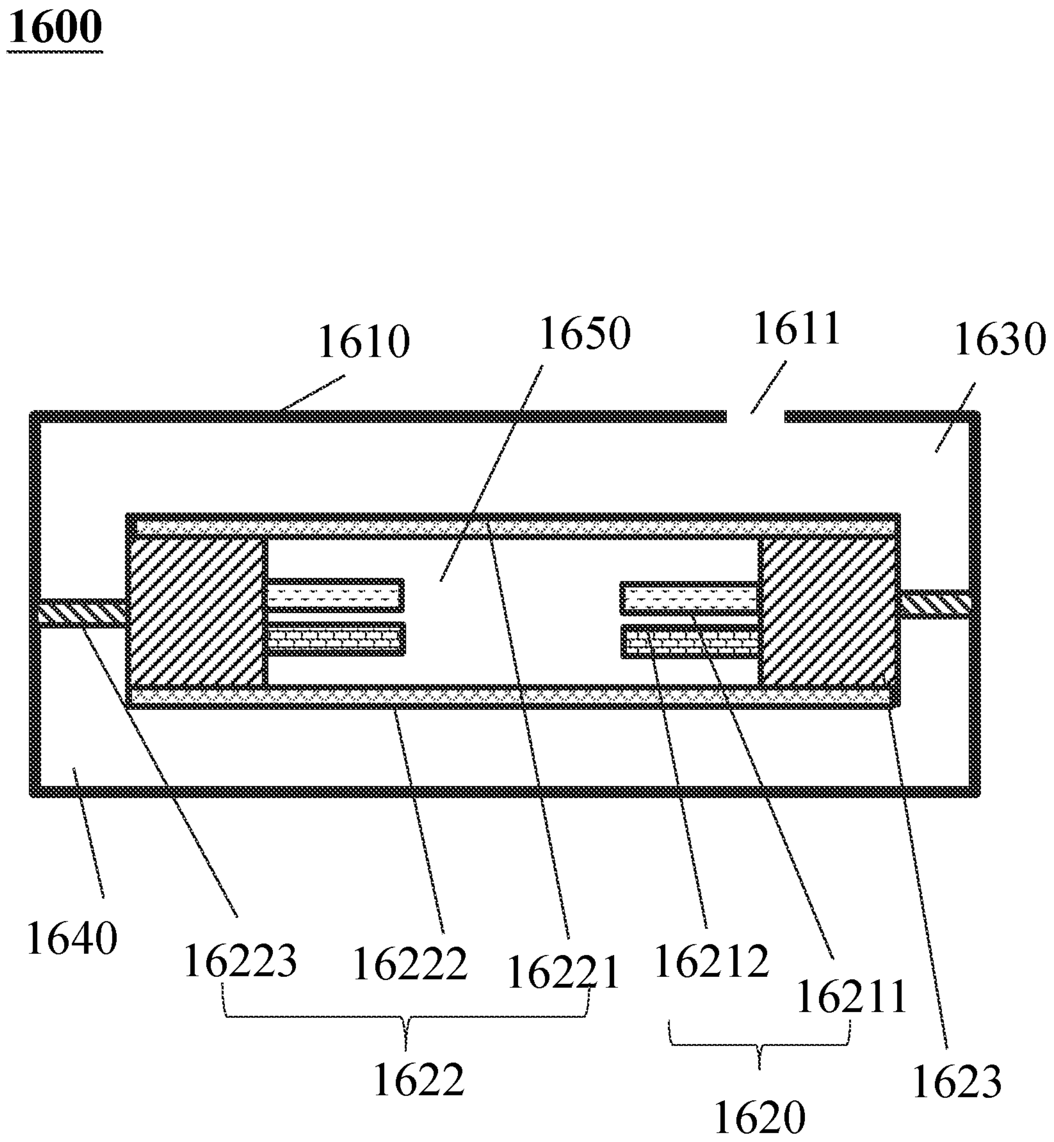
FIG. 16 is a schematic diagram illustrating a structure of a microphone according to some embodiments of the present disclosure.

FIG. 16 is a schematic diagram illustrating a structure of a microphone according to some embodiments of the present disclosure. As shown in FIG. 16, the microphone 1600 may include a shell structure 1610, an acoustic-electric conversion component 1620, a vibration pickup portion 1622, and a vibration transmission portion 1623. The microphone 1600 shown in FIG. 16 may be the same as or similar to the microphone 1000 shown in FIG. 10. For example, a first acoustic cavity 1630, a second acoustic cavity 1640, and a vacuum cavity 1650 of the microphone 1600 may be the same as or similar to the first acoustic cavity 1030, the second acoustic cavity 1040, and the vacuum cavity 1050 of the microphone 1000, respectively. For more structures of the microphone 1600 (e.g., the shell structure 1610, a hole portion 1611, the vibration transmission portion 1623, the acoustic-electric conversion component 1620, etc.), reference may be made to FIG. 10 and its related descriptions.

In some embodiments, the main difference between the microphone 1600 shown in FIG. 16 and the microphone 1000 shown in FIG. 10 may be the vibration pickup portion 1622. In some embodiments, the vibration pickup portion 1622 may include a first vibration pickup portion 16221, a second vibration pickup portion 16222, and a third vibration pickup portion 16223. In some embodiments, the first vibration pickup portion 16221 and the second vibration pickup portion 16222 may be disposed opposite to each other with respect to the vibration transmission portion 1623 so that the vibration transmission portion 1623 may be located between the first vibration pickup portion 16221 and the second vibration pickup portion 16222. Specifically, the lower surface of the first vibration pickup portion 16221 may be connected to an upper surface of the vibration transmission portion 1623. The upper surface of the second vibration pickup portion 16222 may be connected to a lower surface of the vibration transmission portion 1623. In some embodiments, the first vibration pickup portion 16221, the second vibration pickup portion 16222, and the vibration transmission portion 1623 may form a vacuum cavity 1650. The acoustic-electric conversion component 1620 (e.g., a first cantilever beam structure 16211, and a second cantilever beam structure 16212) may be located in the vacuum cavity 1650.

In some embodiments, the third vibration pickup portion 16223 may be connected between the vibration transmission portion 1623 and the inner wall of the shell structure 1610. When the microphone 1600 operates, the sound signal may enter the first acoustic cavity 1630 through the hole portion(s) 1611 and act on the third vibration pickup portion 16223 to generate vibration. The third vibration pickup portion 16223 may transmit the vibration to the acoustic-electric conversion component 1620 through the vibration transmission portion 1623. The details of the third vibration pickup portion 16223 may be referred to FIG. 15 and its related descriptions, and is not repeated here.

In some embodiments, the microphone 1600 may also include at least one film structure (not shown) located on the upper surface and/or lower surface of the acoustic-electric conversion component 1620. For details of at least one film structure, please refer to FIGS. 12 to 14 and their related descriptions, which are not repeated here.

Figure 17:
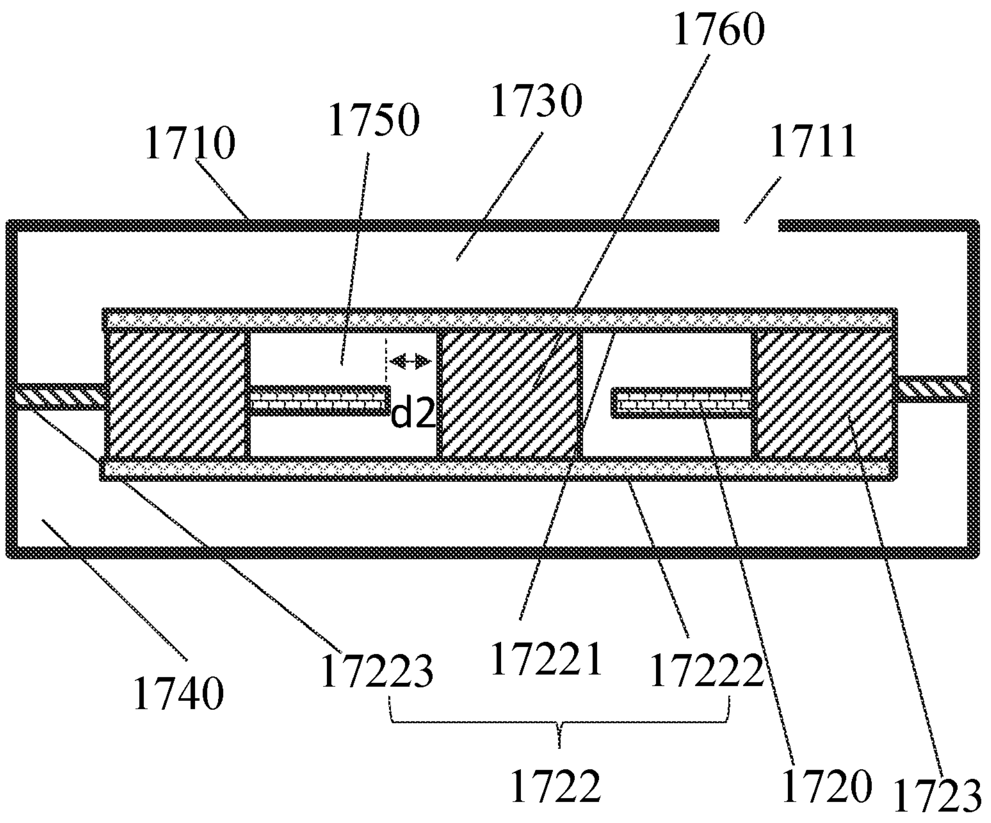
FIG. 17 is a schematic diagram illustrating a structure of a microphone according to some embodiments of the present disclosure.

FIG. 17 is a schematic diagram illustrating a structure of a microphone according to some embodiments of the present disclosure. As shown in FIG. 17, the microphone 1700 may include a shell structure 1710, an acoustic-electric conversion component 1720, a vibration pickup portion 1722, and a vibration transmission portion 1723. The microphone 1700 shown in FIG. 17 may be the same as or similar to the microphone 1500 shown in FIG. 15. For example, a first acoustic cavity 1730, a second acoustic cavity 1740, and a vacuum cavity 1750 of the microphone 1700 may be the same as or similar to the first acoustic cavity 1530, the second acoustic cavity 1540, and the cavity 1550 of the microphone 1500, respectively. As another example, the vibration pickup portion 1722 (e.g., a first vibration pickup portion 17221, a second vibration pickup portion 17222, and a third vibration pickup portion 17223) of the microphone 1700 may be the same as or similar to the vibration pickup portion 1522 (e.g., the first vibration pickup portion 15221, the second vibration pickup portion 15222, and the third vibration pickup portion 15223) of the microphone 1500. For more structures of the microphone 1700 (e.g., the shell structure 1710, a hole portion 1711, the vibration transmission portion 1723, the acoustic-electric conversion component 1720, etc.), reference may be made to FIG. 15 and its related descriptions.

In some embodiments, the main difference between the microphone 1700 shown in FIG. 17 and the microphone 1500 shown in FIG. 15 may be that the microphone 1700 may also include one or more supporting structures 1760. In some embodiments, the supporting structure(s) 1760 may be provided in the vacuum cavity 1750. The upper surface of the supporting structure(s) 1760 may be connected to the lower surface of the first vibration pickup portion 17221. The lower surface of the supporting structure(s) 1760 may be connected to the upper surface of the second vibration pickup portion 17222. On one hand, by setting the supporting structure(s) 1760 in the vacuum cavity 1750 and to connect the first vibration pickup portion 17221 and the second vibration pickup portion, respectively, the rigidity of the first vibration pickup portion 17221 and the rigidity of the second vibration pickup portion 17222 may be further improved. Therefore, the first vibration pickup portion 17221 and the second vibration pickup portion 17222 may not deform due to the effect of the air vibration in the first acoustic cavity 1730. Further, vibration modes of internal devices (e.g., the first vibration pickup portion 17221 and the second vibration pickup portion 17222) of the microphone 1700 may be reduced. At the same time, the supporting structure(s) 1760 may increase the rigidity of the first vibration pickup portion 17221 and the rigidity of the second vibration pickup portion 17222, and may further ensure that the volume of the vacuum cavity 1750 remains basically constant, so that the vacuum degree in the vacuum cavity 1750 may be within the required range (for example, smaller than 100 Pa), thereby reducing the influence of air damping in the vacuum cavity 1750 on the acoustic-electric conversion component 1720 and improving the Q value of the microphone 1700. On the other hand, the supporting structure(s) 1760 may be connected to the first vibration pickup portion 17221 and the second vibration pickup portion17222, respectively, which may also improve the reliability of the microphone 1700 under overload.

In some embodiments, the shape of the supporting structure 1760 may be a regular structure (e.g., a plate-shaped structure, a cylinder, a frustum, a cuboid, a hexahedron, etc.) and/or an irregular structure. In some embodiments, the material of the supporting structure(s) 1760 may include but be not limited to one or more of a semiconductor material, a metallic material, a metallic alloy, an organic material, or the like. In some embodiments, the semiconductor material may include but be not limited to silicon, silicon dioxide, silicon nitride, silicon carbide, or the like. In some embodiments, the metallic material may include but be not limited to copper, aluminum, chromium, titanium, gold, or the like. In some embodiments, the metallic alloy may include but be not limited to copper-aluminum alloy, copper-gold alloy, titanium alloy, aluminum alloy, or the like. In some embodiments, the organic material may include but be not limited to polyimide, parylene, polydimethylsiloxane (PDMS), silica gel, silica, or the like.

Figure 18A:
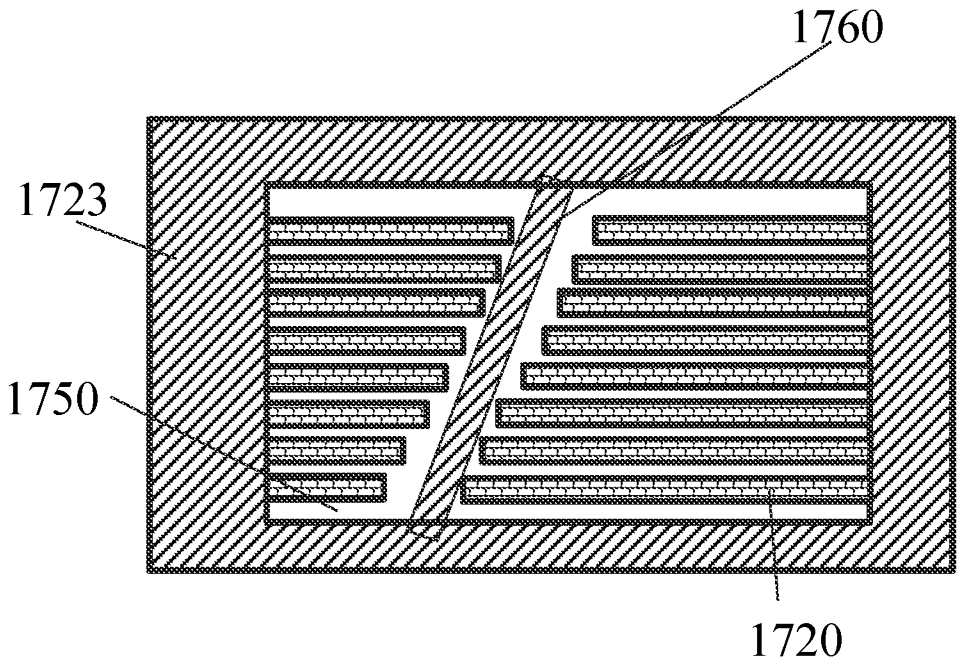
FIG. 18A is a schematic diagram illustrating a cross-sectional view of a microphone according to some embodiments of the present disclosure.
Figure 18B:
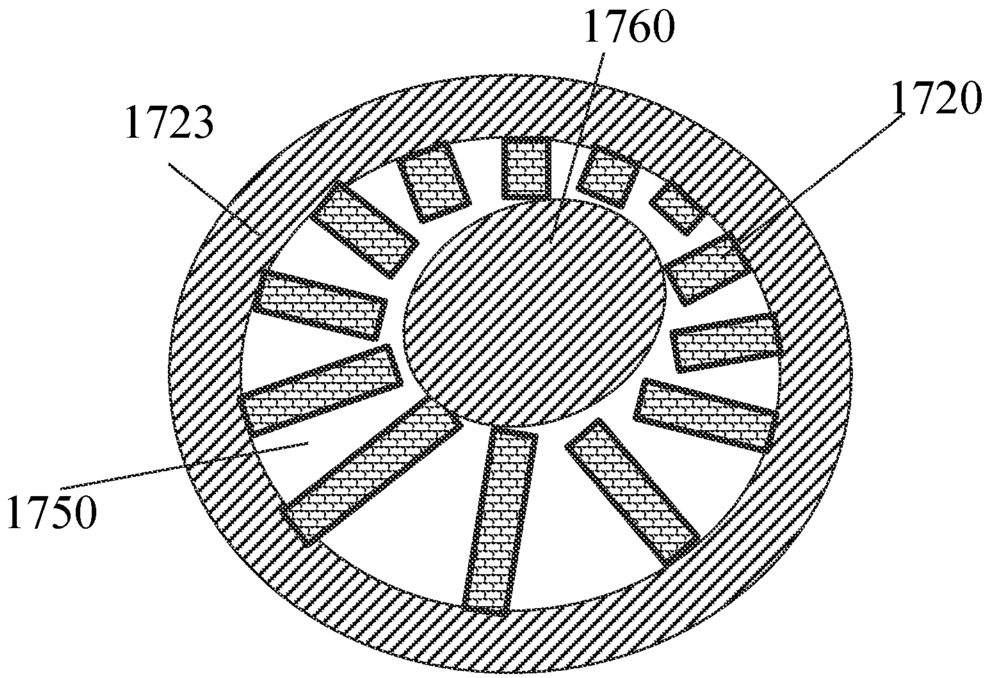
FIG. 18B is a schematic diagram illustrating a cross-sectional view of a microphone according to some embodiments of the present disclosure.

Referring to FIG. 17, in some embodiments, a second gap d2 between the free end (i.e., an end suspended in the vacuum cavity 1750) of the acoustic-electric conversion component 1720 and the supporting structure(s) 1760 may be not smaller than 2 um to prevent the acoustic-electric conversion component 1720 from colliding with the supporting structure(s) 1760 during vibration. Meanwhile, when the second gap d2 is small (for example, the second gap d2 is not greater than 20 um), the overall volume of the microphone 1700 may be effectively reduced. In some embodiments, the second gap d2 between the free end in different acoustic-electric conversion components 1720 (e.g., cantilever beam structures with different lengths) and the supporting structure(s) 1760 may be different. In some embodiments, by designing the supporting structure(s) 1760 with different shapes and sizes, and adjusting the positions of the supporting structure(s) 1760, a plurality of acoustic-electric conversion components 1720 (e.g., cantilever beam structures) may be closely arranged in the vacuum cavity 1750 so that the microphone 1700 may have a smaller overall size. FIG. 18A and FIG. 18B are schematic diagrams illustrating cross-sectional views of microphones in different directions according to some embodiments of the present disclosure. As shown in FIG. 18A and FIG. 18B, when the supporting structure 1760 is an elliptical cylinder, the supporting structure 1760, the vibration transmission portion 1723, and the vibration pickup portion 1722 may form an annular or annular-like cavity in the vacuum cavity 1750. A plurality of acoustic-electric conversion components 1720 may be located in the cavity and interval distributed along the circumference of the supporting structure 1760.

Figure 19A:
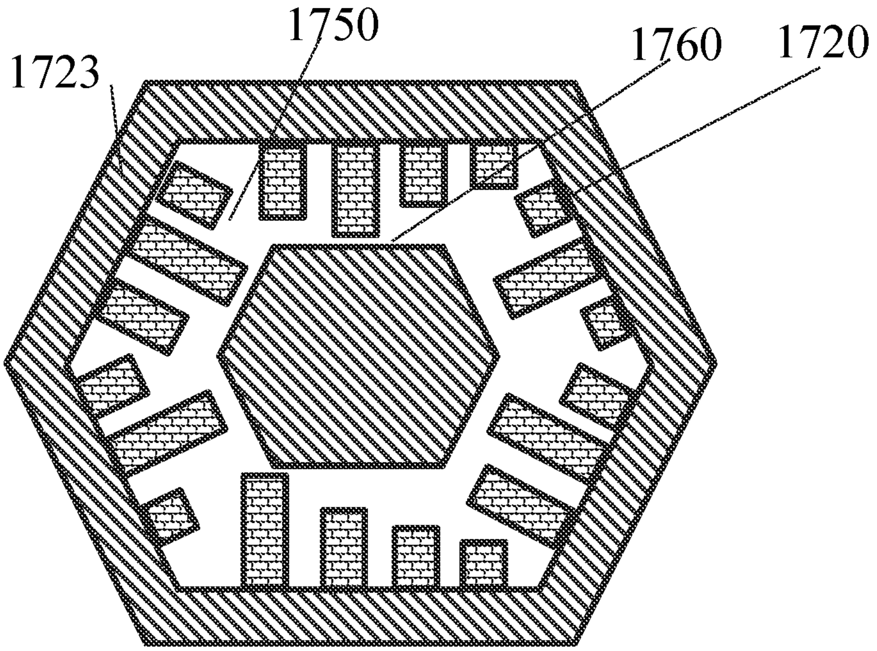
FIG. 19A is a schematic diagram illustrating a cross-sectional view of a microphone according to some embodiments of the present disclosure.
Figure 19B:
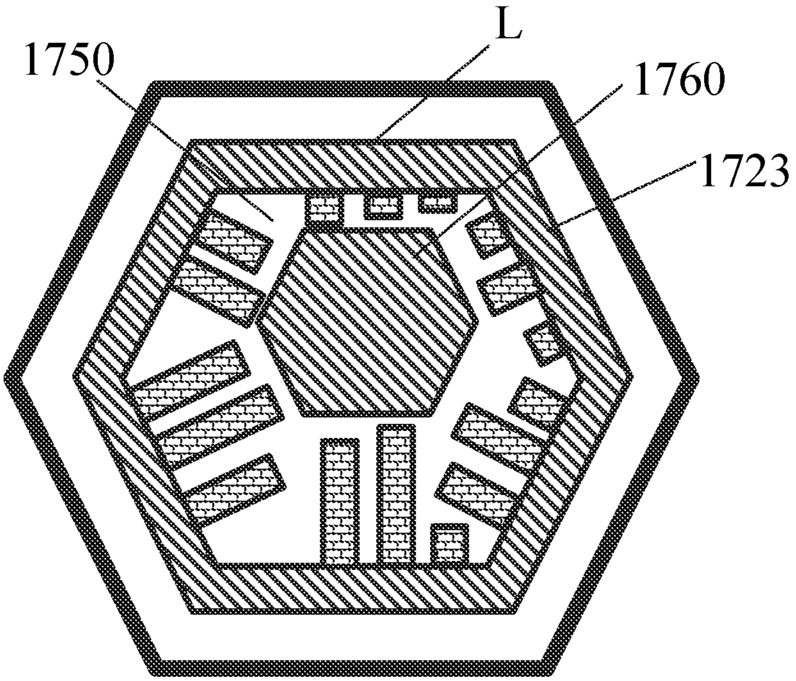
FIG. 19B is a schematic diagram illustrating a cross-sectional view of a microphone according to some embodiments of the present disclosure.

In some embodiments, the supporting structure(s) 1760 may be located in the center of the vacuum cavity 1750. For example, FIG. 19 A is a schematic diagram illustrating a cross-sectional view of a microphone according to some embodiments of the present disclosure. As shown in FIG. 19 A, the supporting structure(s) 1760 may be located in the central position of the vacuum cavity 1750. The central position may be a geometric center of the vacuum cavity 1750. In some embodiments, the supporting structure(s) 1760 may also be provided in the vacuum cavity 1750 near any end of the vibration transmission portion 1723. For example, FIG. 19B is a schematic diagram illustrating a cross-sectional view of a microphone according to some embodiments of the present disclosure. As shown in FIG. 19B, the supporting structure 1760 may be located in the vacuum cavity 1750 near the side wall L of the vibration transmission portion 1723. It should be noted that the shape, the arrangement mode, the position, material, or the like, of the supporting structure 1750 may be adaptively adjusted according to the length, count, distribution mode, or the like, of the acoustic-electric conversion components 1720, and may be not further limited here.

In some embodiments, the microphone 1700 may also include at least one film structure (not shown) disposed on an upper surface and/or lower surface of the acoustic-electric conversion component 1720. In some embodiments, the middle of the film structure may be provided with a hole portion for the supporting structure 1760 to pass through. The hole portion(s) may be the same or different from the cross-sectional shape of the supporting structure(s). In some embodiments, the peripheral side wall of the supporting structure(s) 1760 may be connected to a peripheral portion of the hole portion(s) in the film structure, or may not be connected to the peripheral portion of the hole portion(s) in the film structure. For more descriptions of the shape, material, and structure of the film structure, please refer to FIG. 12 and its related descriptions.

It should be noted that the supporting structure(s) may also be applied to the microphone in other embodiments. For example, it may be applied to the microphone 500 shown in FIG. 5, the microphone 1000 shown in FIG. 10, the microphone 1200 shown in FIG. 12, the microphone 1300 shown in FIG. 13, and the microphone 1200 shown in FIG. 14. When the supporting structure is applied to other microphones, the shape, position, and material of the supporting structure(s) may be adaptively adjusted according to specific circumstances.

Figure 20:
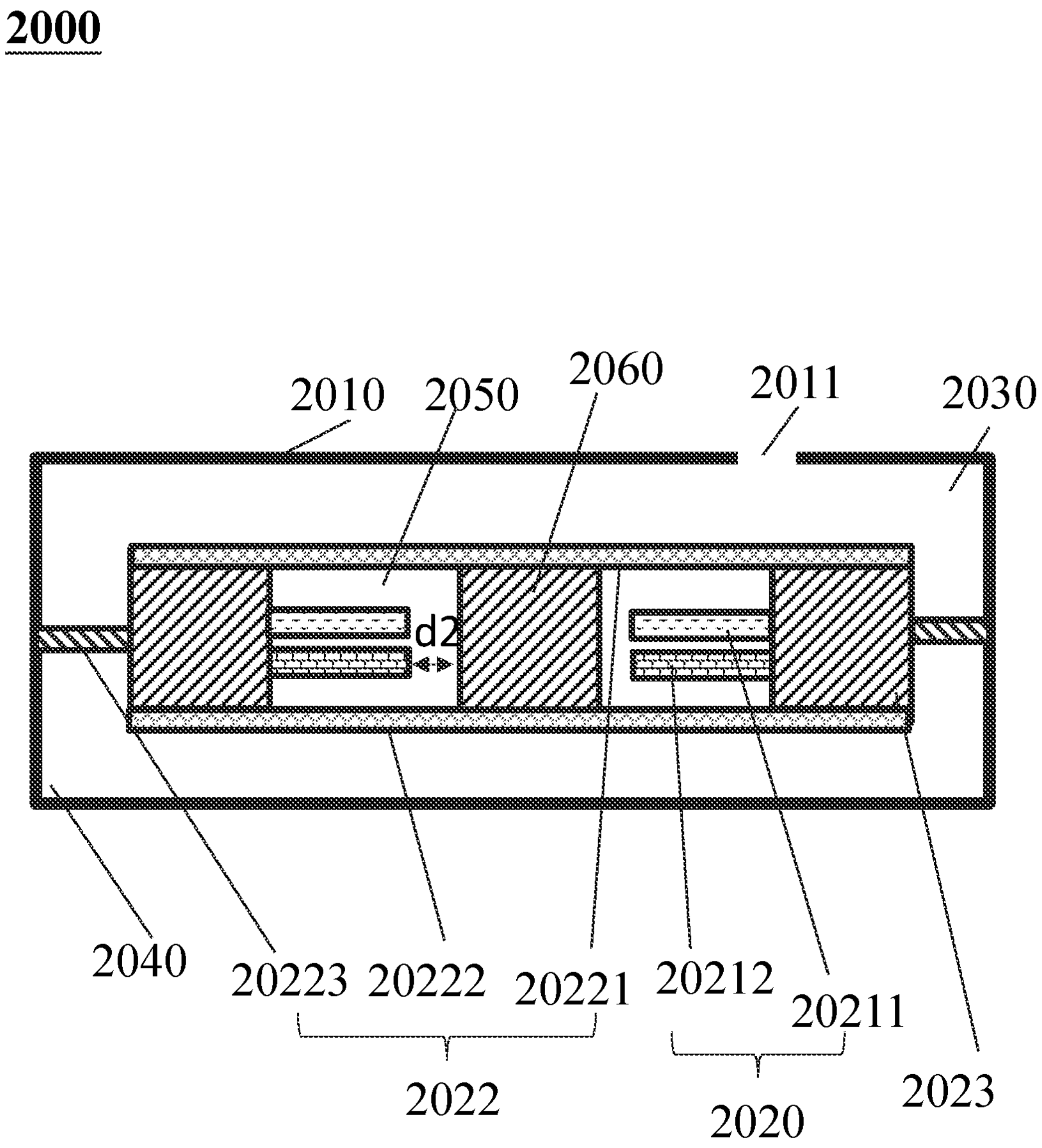
FIG. 20 is a schematic diagram illustrating a structure of a microphone according to some embodiments of the present disclosure.

FIG. 20 is a schematic diagram illustrating a structure of a microphone according to some embodiments of the present disclosure. As shown in FIG. 20, the microphone 2000 may include a shell structure 2010, an acoustic-electric conversion component 2020, a vibration pickup portion 2022, and a vibration transmission portion 2023. The microphone 2000 shown in FIG. 20 may be the same as or similar to the microphone 1600 shown in FIG. 16. For example, the first acoustic cavity 2030, a second acoustic cavity 2040, and a vacuum cavity 2050 of the microphone 2000 may be the same as or similar to the first acoustic cavity 1630, the second acoustic cavity 1640, and the vacuum cavity 1650 of the microphone 1600, respectively. As another example, the vibration pickup portion 2022 (e.g., a first vibration pickup portion 20221, a second vibration pickup portion 20222, and a third vibration pickup portion 20223) of the microphone 2000 may be the same as or similar to the vibration pickup portion 1622 (e.g., the first vibration pickup portion 16221, the second vibration pickup portion 16222, and the third vibration pickup portion 16223) of the microphone 1600. More structures of the microphone 2000 (e.g., the shell structure 2010, the hole portion(s) 2011, the vibration transmission portion 2023, the acoustic-electric conversion component 2020, etc.) may refer to FIG. 16 and its related descriptions.

In some embodiments, the main difference between the microphone 2000 shown in FIG. 20 and the microphone 1600 shown in FIG. 16 may be that the microphone 2000 may also include a supporting structure 2060. In some embodiments, an upper surface of the supporting structure 2060 may be connected to a lower surface of the first vibration pickup portion 20221, and a lower surface of the supporting structure 2060 may be connected to an upper surface of the second vibration pickup portion 20222. In some embodiments, a free end (i.e., an end suspended in the vacuum cavity 2050) of the acoustic-electric conversion component 2020 (e.g., a first cantilever beam structure 20211, a second cantilever beam structure 20212) and the supporting structure 2060 may have the second gap d2. More descriptions of the supporting structure 2060 may refer to FIG. 17 and its related descriptions.

In some embodiments, the microphone 2000 may also include at least one film structure (not shown in the figures). Detailed description of the at least one film structure of the microphone 2000 including the supporting structure 2060 may refer to FIG. 13, FIG. 14, FIG. 17 and their related descriptions thereof.

Figure 21:
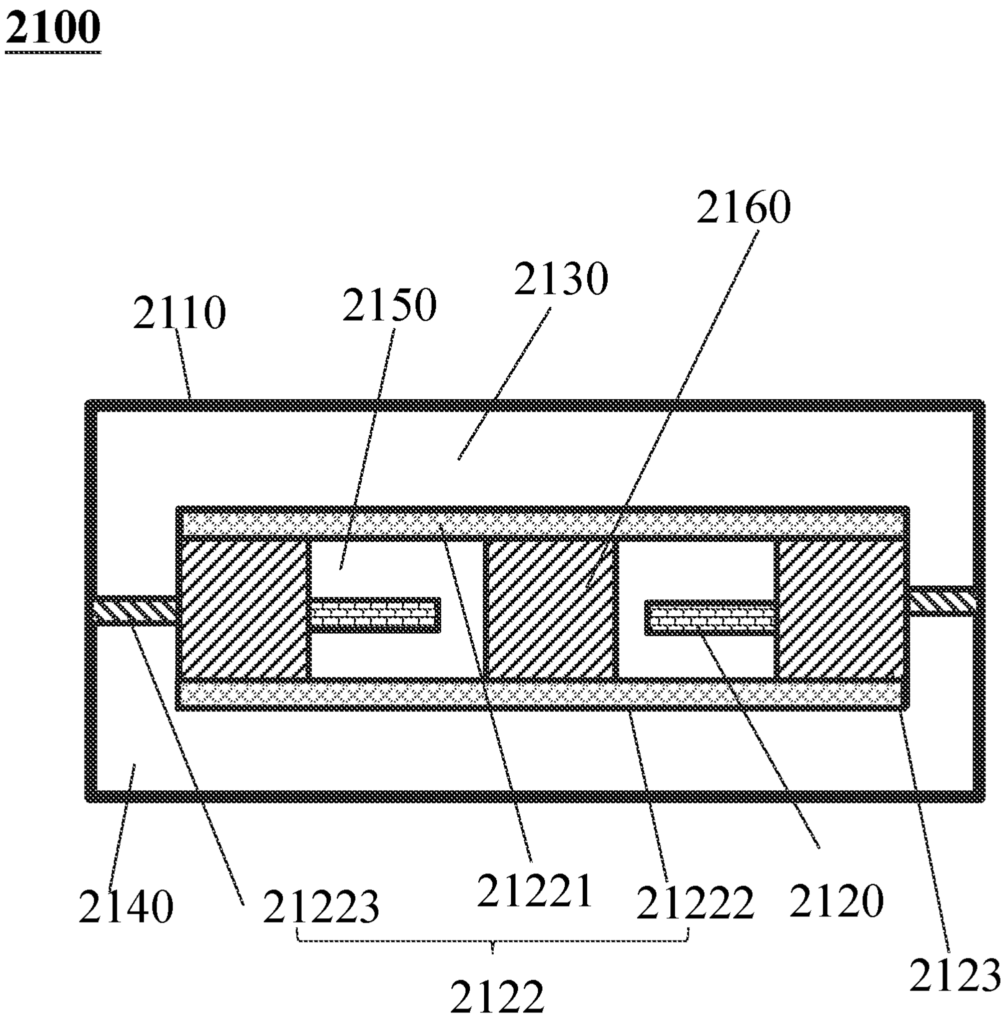
FIG. 21 is a schematic diagram illustrating a structure of a microphone according to some embodiments of the present disclosure.

FIG. 21 is a schematic diagram illustrating a structure of a microphone according to some embodiments of the present disclosure. In some embodiments, the microphone may be a bone conduction microphone. As shown in FIG. 21, the bone conduction microphone 2100 may include a shell structure 2110, an acoustic-electric conversion component 2120, a vibration pickup portion 2122, and a vibration transmission portion 2123. The components of the bone conduction microphone 2100 shown in FIG. 21 may be the same as or similar to those of the microphone 1700 shown in FIG. 17, for example, the acoustic-electric conversion component 2120, a first acoustic cavity 2130, a second acoustic cavity 2140, a vacuum cavity 2150, the vibration pickup portion 2122 (e.g., a first vibration pickup portion 21221, a second vibration pickup portion 21222), the vibration transmission portion 2123, the supporting structure 2160, or the like.

In some embodiments, the main difference between the bone conduction microphone 2100 and the microphone 1700 is shown in FIG. 17 may be that the vibration pickup mode is different. The vibration pickup portion 1722 (e.g., the third vibration pickup portion 17223) of the microphone 1700 may pick up the vibration signal of the air transmitted to the first acoustic cavity 1730 through the hole portion(s) 1711. However, the shell structure 2110 of the bone conduction microphone 2100 does not include the hole portion. The bone conduction microphone 2100 may generate a vibration signal in response to the vibration of the shell structure 2110 through the vibration pickup portion 2122 (e.g., the third vibration pickup portion 21223). Specifically, the shell structure 2110 may generate vibration based on an external sound signal. The third vibration pickup portion 21223 may generate a vibration signal in response to the vibration of the shell structure 2110, and transmit the vibration signal to the acoustic-electric conversion component 2120 through the vibration transmission portion 2123. The acoustic-electric conversion component 2120 may convert the vibration signal into an electrical signal and outputs it.

Figure 22:
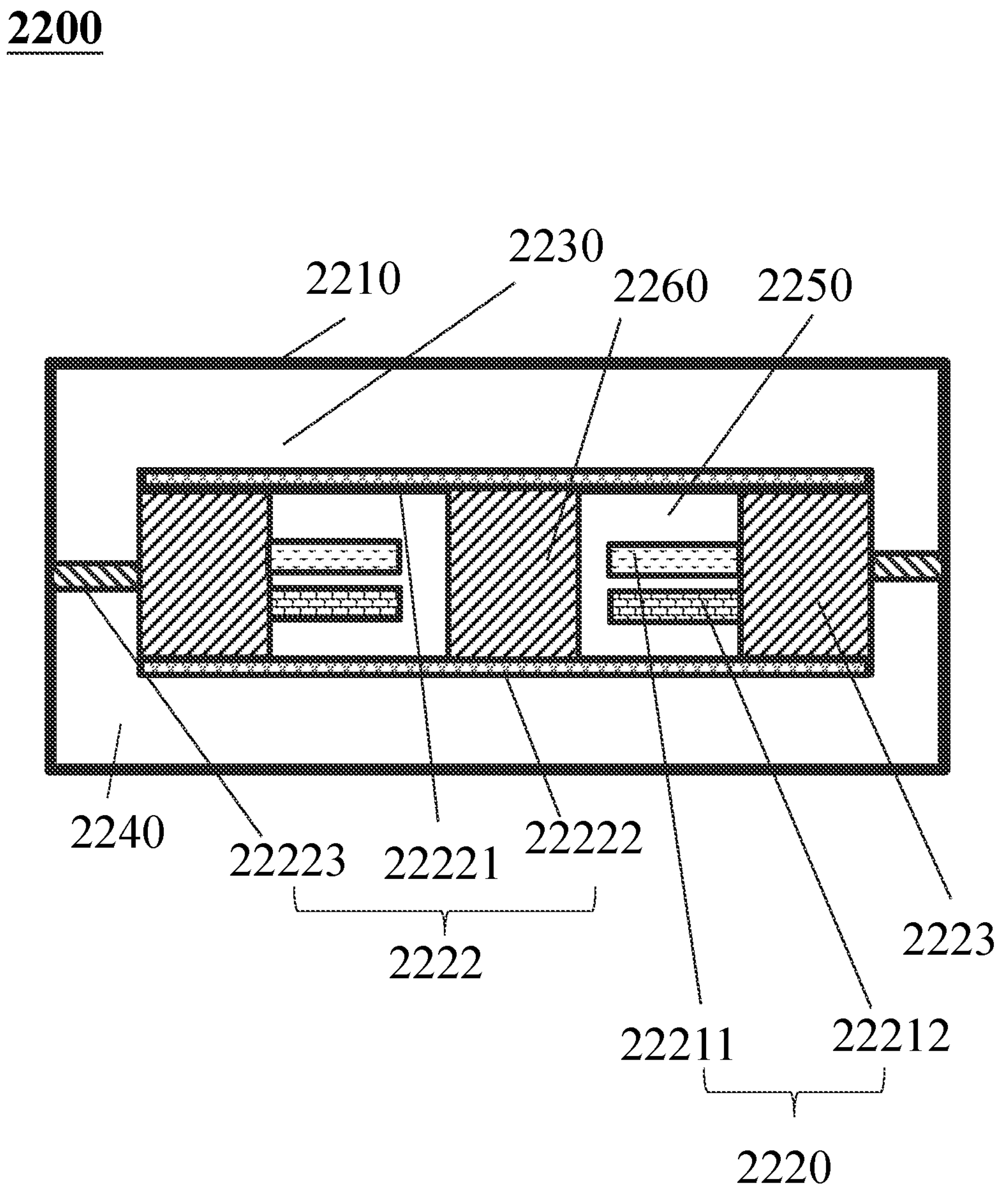
FIG. 22 is a schematic diagram illustrating a structure of a microphone according to some embodiments of the present disclosure.

FIG. 22 is a schematic diagram illustrating a structure of a microphone according to some embodiments of the present disclosure. As shown in FIG. 22, the bone conduction microphone 2200 may include a shell structure 2210, an acoustic-electric conversion component 2220, a vibration pickup portion 2222, and a vibration transmission portion 2223. The components of the bone conduction microphone 2200 shown in FIG. 22 may be the same as or similar to those of the microphone 2000 shown in FIG. 20, for example, an acoustic-electric conversion component 2220, a first acoustic cavity 2230, a second acoustic cavity 2240, a vacuum cavity 2250, the vibration pickup portion 2222 (e.g., a first vibration pickup portion 22221, a second vibration pickup portion 22222), the vibration transmission portion 2223, the supporting structure 2260, or the like.

In some embodiments, the difference between the bone conduction microphone 2200 and the microphone 2000 shown in FIG. 20 may be that the vibration pickup mode is different. The vibration pickup portion 2022 (e.g., the third vibration pickup portion 20223) of the microphone 2000 may pick up the vibration signal of the air transmitted to the first acoustic cavity 2030 through the hole portion(s) 2011. However, the shell structure 2210 of the bone conduction microphone 2200 does not include the hole portion. The bone conduction microphone 2200 may generate a vibration signal in response to the vibration of the shell structure 2210 by the vibration pickup portion 2222 (e.g., a third vibration pickup portion 22223). In some embodiments, the shell structure 2210 may generate vibration based on an external sound signal. The third vibration pickup portion 22223 may generate a vibration signal in response to the vibration of the shell structure 2210, and transmit the vibration signal to the acoustic-electric conversion component 2220 (e.g., a first cantilever beam structure 22211 and a second cantilever beam structure 22212) through the vibration transmission portion 2223. The acoustic-electric conversion component 2220 may convert the vibration signal into an electrical signal and outputs it.

It should be noted that the microphone 500 shown in FIG. 5, the microphone 1000 shown in FIG. 10, the microphone 1200 shown in FIG. 12, and the microphone 1300 shown in FIG. 13 may also be used as bone conduction microphones. For example, the microphone may not be provided with hole portions, and the shell structure may generate vibration based on the external sound signal. The first vibration pickup portion or the second vibration pickup portion may generate a vibration signal in response to the vibration of the shell structure. The vibration may be transmitted to the acoustic-electric conversion component through the vibration transmission portion. The acoustic-electric conversion component may convert the vibration signal into an electrical signal and outputs it.

The basic concepts have been described above. Obviously, for those skilled in the art, the above-detailed disclosure is only an example and does not constitute a limitation of the present disclosure. Although not explicitly stated here, those skilled in the art may make various modifications, improvements, and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, "one embodiment", "one implementation examples", and/or "some embodiments" means a characteristic, structure, or characteristics related to the present disclosure at least one embodiment. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

In addition, those skilled in the art can understand that various aspects of the present disclosure may be illustrated and described through several patentable categories or situations, including any new and useful process, machine, product or combination of materials, or any new and useful improvement to them. Accordingly, all aspects of the present disclosure may be performed entirely by hardware, may be performed entirely by software (including firmware, resident software, microcode, etc.), or may be performed by a combination of hardware and software. The above hardware or software can be referred to as "data block", "module", "engine", "unit", "component" or "system". In addition, aspects of the present disclosure may appear as a computer product located in one or more computer-readable media, the product including computer-readable program code.

The computer storage medium may contain a transmission signal of data containing a computer program code, for example, on baseband or as part of a carrier wave. The transmission signal may have a variety of expression forms, including electromagnetic forms, light forms, etc., or a suitable combination form. The computer storage medium may be any computer-readable medium other than a computer-readable storage medium, which may be connected to an instruction execution system, device, or equipment to achieve communication, propagation, or transmission of a program for use. The program code located on the computer storage medium may be transmitted through any suitable medium, including radio, cable, optical fiber cable, RF, or similar medium, or any combination of the above media.

The computer program code required for the operation of each part of the present disclosure may be written in any one or more programming languages, including object-oriented programming languages such as Java, Scala, Smalltalk, Eiffel, JADE, Emerald, C++, C#, VB.NET, python, or the like, conventional programming languages such as C language, visual basic, Fortran 2003, Perl, COBOL 2002, PHP, ABAP, dynamic programming languages such as Python, Ruby, Groovy, or other programming languages. The program code may be run entirely on the user's computer, or as a separate software package on the user's computer, or partially on the user's computer, partially on the remote computer, or entirely on the remote computer or server. In the latter case, the remote computer may be connected to the user's computer through any network form, such as a local area network (LAN) or a wide area network (WAN), or connected to an external computer (e.g., through the Internet), or in a cloud computing environment, or used as a service, such as software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the disclosure are to be understood as being modified in some instances by the term "about," "approximate," or "substantially," etc. Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, numerical data should take into account the specified significant digits and use an algorithm reserved for general digits. Notwithstanding that the numerical ranges and parameters configured to illustrate the broad scope of some embodiments of the present disclosure are approximations, the numerical values in specific examples may be as accurate as possible within a practical scope.

For each patent, patent application, patent application disclosure, and other materials cited in the present disclosure, such as articles, books, specifications, publications, documents, etc., the entire contents are hereby incorporated into the present disclosure for reference. Application history documents that are inconsistent with or conflict with the content of the present disclosure, as are documents (currently or later appended to the present disclosure) that limit the broadest scope of claims of the present disclosure. It should be noted that in case of any inconsistency or conflict between the description, definitions, and/or use of terms used in the attached materials of the present disclosure and the contents described in the present disclosure, the description, definitions, and/or terms used in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A microphone, comprising:

a shell structure;

a vibration pickup portion, wherein the vibration pickup portion generates vibration in response to vibration of the shell structure, the vibration pickup portion comprises a first vibration pickup portion, a second vibration pickup portion, and a third vibration pickup portion, a rigidity of the first vibration pickup portion and a rigidity of the second vibration pickup portion is greater than a rigidity of the third vibration pickup portion, the first vibration pickup portion and the second vibration pickup portion is arranged opposite to each other from up to down;

a vibration transmission portion, wherein the vibration transmission portion having a tubular structure being arranged between the first vibration pickup portion and the second vibration pickup portion, the vibration transmission portion, the first vibration pickup portion, and the second vibration pickup portion form a vacuum cavity, the third vibration pickup portion is connected between the vibration transmission portion and an inner wall of the shell structure; and an acoustic-electric conversion component configured to receive the vibration transmitted by the vibration transmission portion to generate an electrical signal; and the acoustic-electric conversion component is located in the vacuum cavity.

2. The microphone of claim 1, wherein a vacuum degree in the vacuum cavity is smaller than 100 Pa.

3. The microphone of claim 1, wherein the vibration pickup portion and the shell structure form at least one acoustic cavity, the at least one acoustic cavity comprising a first acoustic cavity; and the shell structure comprises at least one hole portion, the at least one hole portion is located at a side wall of the shell structure corresponding to the first acoustic cavity, and the at least one hole portion connects the first acoustic cavity with outside, wherein the vibration pickup portion generates the vibration in response to the external sound signal transmitted through the at least one hole portion; and the acoustic-electric conversion component receives the vibration of the vibration pickup portion to generate the electrical signal.

4. The microphone of claim 1, wherein Young's modulus of the first vibration pickup portion and Young's modulus of the second vibration pickup portion are greater than 50 GPa.

5. The microphone of claim 1, wherein the acoustic-electric conversion component includes a cantilever beam structure, one end of the cantilever beam structure is connected to an inner wall of the vibration transmission portion, and another end of the cantilever beam structure is suspended in the vacuum cavity, wherein the cantilever beam structure deforms based on a vibration signal to convert the vibration signal into an electrical signal.

6. The microphone of claim 5, wherein the cantilever beam structure comprises a first electrode layer, a piezoelectric layer, a second electrode layer, an elastic layer, and a base layer;

the first electrode layer, the piezoelectric layer, and the second electrode layer are arranged from top to bottom;

the elastic layer is located on an upper surface of the first electrode layer or a lower surface of the second electrode layer, and the base layer is located on an upper surface or a lower surface of the elastic layer.

7. The microphone of claim 5, wherein the cantilever beam structure comprises at least one elastic layer, an electrode layer, and a piezoelectric layer;

the at least one elastic layer is located on a surface of the electrode layer;

the electrode layer comprises a first electrode and a second electrode, wherein the first electrode is bent into a first comb-like structure;

the second electrode is bent into a second comb-like structure;

the first comb-like structure and the second comb-like structure are cooperated to form the electrode layer;

the electrode layer is located on an upper surface or a lower surface of the piezoelectric layer; and the first comb-like structure and the second comb-like structure extend along a length direction of the cantilever beam structure.

8. The microphone of claim 1, wherein the acoustic-electric conversion component comprises a first cantilever beam structure and a second cantilever beam structure, the first cantilever beam structure and the second cantilever beam structure are arranged opposite to each other, and the first cantilever beam structure and the second cantilever beam structure have a first gap, wherein the first gap between the first cantilever beam structure and the second cantilever beam structure changes based on a vibration signal to convert the vibration signal into an electrical signal.

9. The microphone of claim 8, wherein one end of the first cantilever beam structure and the second cantilever beam structure corresponding to the acoustic-electric conversion component is connected to an inner wall of a peripheral side of the vibration transmission portion, and another end of the first cantilever beam structure and the second cantilever beam structure is suspended in the vacuum cavity.

10. The microphone of claim 8, wherein a rigidity of the first cantilever beam structure is different from a rigidity of the second cantilever beam structure.

11. The microphone of claim 1, wherein the microphone comprises at least one film structure, the at least one film structure being located on an upper surface or a lower surface of the acoustic-electric conversion component.

12. The microphone of claim 11, wherein the at least one film structure wholly or partially covers the upper surface or the lower surface of the acoustic-electric conversion component.

13. The microphone of claim 1, wherein the microphone comprises at least one supporting structure, one end of the at least one supporting structure is connected to the first vibration pickup portion of the vibration pickup portion, another end of the at least one supporting structure is connected to the second vibration pickup portion of the vibration pickup portion, and a free end of the acoustic-electric conversion component and the supporting structure have a second gap.

* * * * *